(12) United States Patent
Pendyala et al.

(10) Patent No.: US 10,331,782 B2
(45) Date of Patent: Jun. 25, 2019

(54) SYSTEMS AND METHODS FOR AUTOMATIC IDENTIFICATION OF POTENTIAL MATERIAL FACTS IN DOCUMENTS

(71) Applicant: LexisNexis, a division of Reed Elsevier Inc., Miamisburg, OH (US)

(72) Inventors: Mahesh Pendyala, Folsom, CA (US); Gene Osgood, Mamaroneck, NY (US); Jacob Aaron Myers, Dayton, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 785 days.

(21) Appl. No.: 14/944,692

(22) Filed: Nov. 18, 2015

(65) Prior Publication Data

US 2016/0140210 A1     May 19, 2016

Related U.S. Application Data

(60) Provisional application No. 62/081,786, filed on Nov. 19, 2014.

(51) Int. Cl.
*G06F 16/00*     (2019.01)
*G06F 17/27*     (2006.01)
(Continued)

(52) U.S. Cl.
CPC .......... *G06F 17/2705* (2013.01); *G06F 16/35* (2019.01); *G06F 16/93* (2019.01); *G06F 17/2765* (2013.01); *G06Q 50/18* (2013.01)

(58) Field of Classification Search
CPC .......... G06F 17/30675; G06F 17/30663; G06F 17/30011; G06F 17/30722; G06F 17/3053;
(Continued)

(56) References Cited

U.S. PATENT DOCUMENTS 5,265,065 A   11/1993   Turtle
5,418,948 A    5/1995   Turtle
(Continued)

OTHER PUBLICATIONS

Talukdar, Partha Pratim, Wijaya, Derry, Mitchell, Tom, "Acquiring Temporal Constraints between Relations," Carnegie Mellon University, CIKM '12, Oct. 29-Nov. 2, 2012.
(Continued)

*Primary Examiner* — Yicun Wu
(74) *Attorney, Agent, or Firm* — Dinsmore & Shohl LLP

(57) ABSTRACT

Systems and methods to identify potential material fact sentences in electronic legal documents obtained from electronic repositories are disclosed. A system includes a processing device and a storage medium in communication with the processing device. The storage medium includes programming instructions that cause the processing device to obtain a document and parse text within the document to determine whether each paragraph in the document is a fact paragraph, a discussion paragraph, or an outcome paragraph based on at least one of a heading associated with the paragraph and features of the paragraph. The storage medium further includes programming instructions that cause the processing device to extract each sentence in the fact paragraph, direct a trained sentence classifier to determine whether each sentence is a potential material fact sentence or a non-material fact sentence based on features of the sentence, and identify potential material fact sentences.

20 Claims, 10 Drawing Sheets

(51) Int. Cl.
*G06Q 50/18* (2012.01)
*G06F 16/93* (2019.01)
*G06F 16/35* (2019.01)

(58) Field of Classification Search
CPC ......... G06F 17/30707; G06F 17/30864; G06F 17/3061; G06F 17/30646; G06F 17/30696; G06F 17/30598; G06F 17/30616; G06F 17/30634; G06F 17/30672; G06F 17/30728; G06F 7/24; G06F 15/16; G06F 17/00; G06F 17/21; G06F 17/243; G06F 17/2705; G06F 17/2765; G06F 17/2775; G06F 17/30; G06F 17/30014; G06F 17/30194; G06F 17/30227; G06F 17/30244; G06F 17/30265; G06F 17/30648; G06F 17/30705; G06F 17/3071; G06Q 10/10; G06Q 50/18; G06Q 50/184; G06Q 10/06; G06Q 30/0202; G06Q 40/06; G06Q 50/00; G06Q 99/00
See application file for complete search history.

(56) References Cited

U.S. PATENT DOCUMENTS

| | | |
|---|---|---|
| 5,488,725 A | 1/1996 | Turtle et al. |
| 5,544,352 A | 8/1996 | Egger |
| 5,720,003 A | 2/1998 | Chiang et al. |
| 5,771,378 A | 6/1998 | Holt et al. |
| 5,778,155 A | 7/1998 | Hepner |
| 5,819,248 A | 10/1998 | Kegan |
| 5,819,260 A | 10/1998 | Lu et al. |
| 5,832,494 A | 11/1998 | Egger et al. |
| 5,850,490 A | 12/1998 | Johnson |
| 5,918,240 A | 6/1999 | Kupiec et al. |
| 6,055,531 A | 4/2000 | Bennett et al. |
| 6,167,369 A | 12/2000 | Schulze |
| 6,192,360 B1 | 2/2001 | Dumais et al. |
| 6,226,620 B1 | 5/2001 | Oon |
| 6,289,342 B1 | 9/2001 | Lawrence et al. |
| 6,311,176 B1 | 10/2001 | Steiner |
| 6,502,081 B1 | 12/2002 | Wiltshire, Jr. et al. |
| 6,772,149 B1 * | 8/2004 | Morelock ......... G06F 17/30675 |
| 7,610,313 B2 | 10/2009 | Kawai et al. |
| 7,668,791 B2 | 2/2010 | Azzam et al. |
| 8,112,268 B2 | 2/2012 | Chen et al. |
| 8,554,715 B2 | 10/2013 | Kraaij et al. |
| 8,990,065 B2 | 3/2015 | Raskino et al. |
| 9,177,050 B2 * | 11/2015 | Lu ..................... G06F 17/30722 |
| 2004/0122709 A1 | 6/2004 | Avinash et al. |
| 2008/0027888 A1 | 1/2008 | Azzam et al. |
| 2011/0066616 A1 | 3/2011 | Rhoads et al. |
| 2012/0036125 A1 * | 2/2012 | Al-Kofahi ......... G06F 17/30637 707/728 |
| 2012/0078926 A1 | 3/2012 | Chu-Carroll et al. |
| 2012/0116812 A1 | 5/2012 | Boone et al. |
| 2012/0323824 A1 | 12/2012 | Gansner |
| 2013/0166485 A1 | 6/2013 | Hoffmann |
| 2013/0246017 A1 | 9/2013 | Heckerman et al. |
| 2013/0297540 A1 | 11/2013 | Hickok |
| 2014/0129213 A1 | 5/2014 | Kimelfeld et al. |

OTHER PUBLICATIONS

Gardner, Matt, Talukdar, Partha Pratim, Kisiel, Bryan, and Mitchell, Tom, "Improving Learning and Inference in a Large Knowledge-base using Latent Syntactic Cues," Carnegie Mellon University.

Wijaya, Derry, Talukdar, Partha Pratim, Mitchell, Tom, "PIDGIN: Ontology Alignment using Web Text as Interlingua," Carnegie Mellon University, CIKM '13, Oct. 27-Nov. 1, 2013.

Search Report for Application No. PCT/US15/61539 dated Mar. 16, 2016.

Meldman, J. A., "A structural model for computer-aided legal analysis." Rutgers Journal of Computers and the Law, vol. 6, pp. 27-71, 1977.

Rissland, E. L. & Ashley, K. D., "A case-based system for trade secrets law." Proceedings of 1st International Conference on Al and Law, Boston, pp. 60-66, 1987.

Moens, M. F. et al., "Abstracting of legal cases: The SALOMON experience," Proceedings of 6th International Conference on Al and Law, Melbourne, pp. 114-122, 1997.

Dick, J., "Conceptual retrieval and case law." Proceedings of 1st International Conference on Al and Law, Boston, pp. 106-115, 1987.

Smith, J. C. and Gelbart, D., "FLEXICON: An evolution of a statistical ranking model adopted for intelligent legal text management." Proceedings of The 4th International Conference on Artificial Intelligence and Law, Amsterdam, pp. 142-151, 1993.

Pannu, A. S., "Using genetic algorithms to inductively reason with cases in the legal domain." Proceedings of 5th International Conference on Al and Law, College Park, MD, pp. 175-184, 1995.

Tyree, A. L., "Fact content analysis of caselaw: methods and limitations." Jurimetrics Journal, Fall 1981, pp. 1-33, 1981.

Rissland, E. L. & Daniels, J. J., "A hybrid CBR-IR approach to legal information retrieval." Proceedings of 5th International Conference on Al and Law, College Park, MD, pp. 52-61, 1995.

Hafner, C. D., "Conceptual organization of caselaw knowledge base." Proceedings of 1st International Conference on Al and Law, Boston, pp. 35-42, 1987.

Daniels, J. J. & Rissland, E. L., "Finding legally relevant passage in case opinions." Proceedings of 6th International Conference on Al and Law, Melbourne, pp. 39-46, 1997.

Nitta, K. et al., "New HELIC-II: A software tool for legal reasoning." Proceedings of 5th International Conference on Al and Law, College Park, MD, pp. 287-296, 1995.

Rissland, E. L. et al., "BankXX: A program to generate argument through case-based search." Proceedings of 4th International Conference on Al and Law, Amsterdam, pp. 117-124, 1993.

"Finding Factors: Learning to Classify Case Opinions under Abstract Fact Categories"—Stefanie Bruninghaus and Kevin D. Ashley—1997 (pp. 123-131).

"Expert Systems in Case-Based Law: The Hearsay Rule Advisor"—Marilyn T. MacCrimmon- ACM—089791-322-1/89/0600/0068( (pp. 68-73).

Smith, J. C., "The use of lexicons in information retrieval in legal databases." Proceedings of The 6th International Conference on Artificial Intelligence and Law, Melbourne, pp. 29-38, 1997.

* cited by examiner

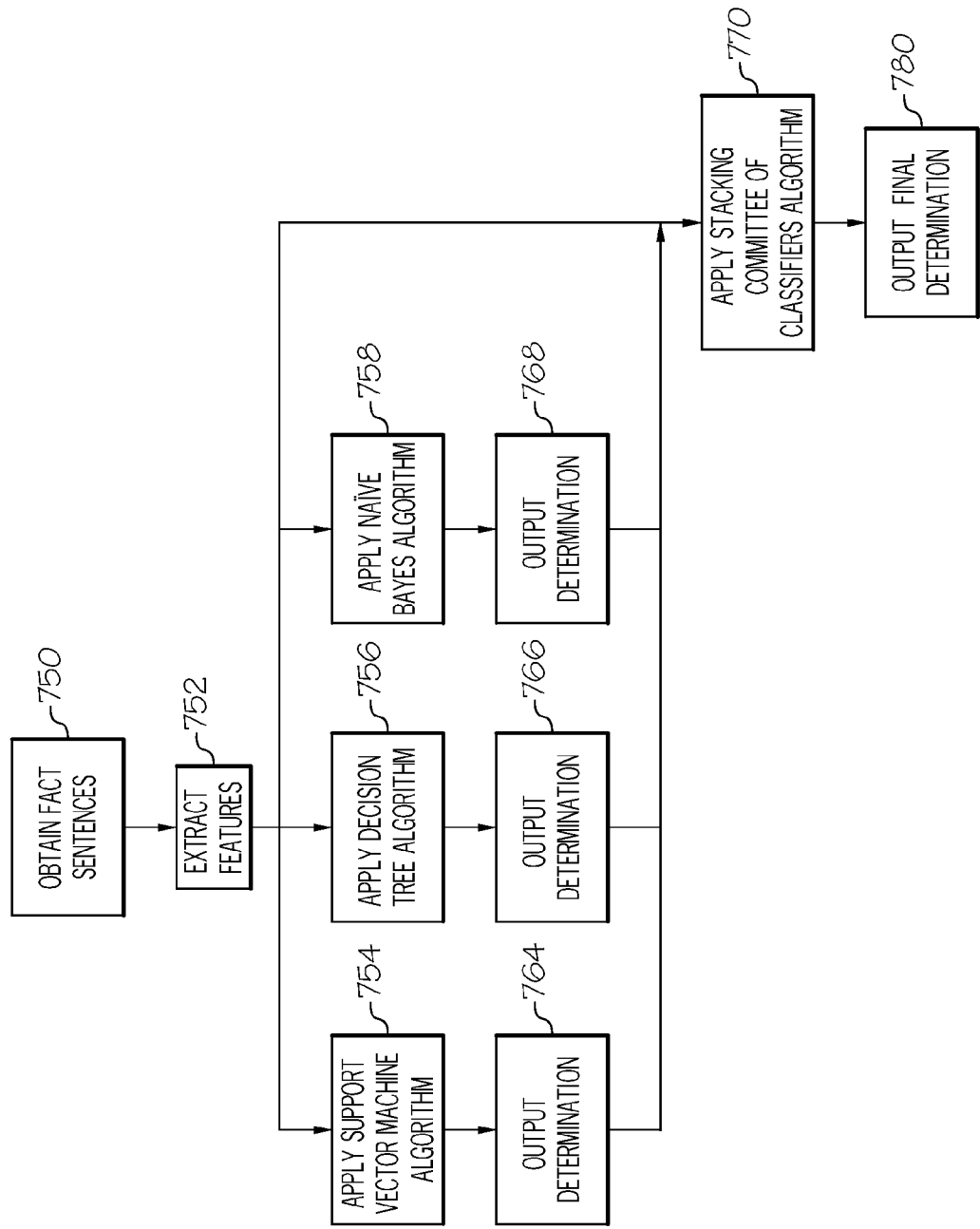

SYSTEMS AND METHODS FOR AUTOMATIC IDENTIFICATION OF POTENTIAL MATERIAL FACTS IN DOCUMENTS

CROSS REFERENCE TO RELATED APPLICATIONS

The present application claims priority to U.S. Provisional Patent Application Ser. No. 62/081,786, filed Nov. 19, 2014 and entitled "Systems and Methods for Automatic Identification of Potential Material Facts in Documents," which is incorporated by reference herein in its entirety.

BACKGROUND

Field

For various legal matters, it is often necessary to determine the material facts of a document, such as, for example, a court opinion, a pleading document, a demand document, and the like. When researching a legal matter, individuals may desire to find other cases with similar material fact patterns. Sometimes the material facts are difficult to isolate in a document and require comprehension of the context. Accordingly, it would be desirable to automatically determine and obtain analogous material facts from documents that relate to a particular legal opinion.

Technical Background

Embodiments of the present disclosure automatically identify fact paragraphs in case law opinions and determine potential material fact sentences in the fact paragraphs.

SUMMARY

In one embodiment, a system to identify potential material fact sentences in electronic legal documents obtained from electronic repositories includes a processing device and a non-transitory, processor-readable storage medium in communication with the processing device. The non-transitory, processor-readable storage medium includes one or more programming instructions that, when executed, cause the processing device to obtain an electronic legal document from a repository and parse text within the electronic legal document to determine whether each one of one or more paragraphs in the legal document is a fact paragraph, a discussion paragraph, or an outcome paragraph based on at least one of a heading associated with the paragraph and one or more features of the paragraph. For each one of the one or more paragraphs that is a fact paragraph, the non-transitory, processor-readable storage medium further includes one or more programming instructions that, when executed, cause the processing device to extract each one of one or more sentences in the fact paragraph, direct a trained sentence classifier to determine whether each one of the one or more sentences is a potential material fact sentence or a non-material fact sentence based on one or more features of the sentence, and identify one or more potential material fact sentences from the one or more sentences based on the determination.

In another embodiment, a method to identify potential material fact sentences in electronic legal documents obtained from electronic repositories includes obtaining, by a processing device, an electronic legal document from a repository and parsing, by the processing device, text within the electronic legal document to determine whether each one of one or more paragraphs in the legal document is a fact paragraph, a discussion paragraph, or an outcome paragraph based on at least one of a heading associated with the paragraph and one or more features of the paragraph. For each one of the one or more paragraphs that is a fact paragraph, the method also includes extracting, by the processing device, each one of one or more sentences in the fact paragraph, directing, by the processing device, a trained sentence classifier to determine whether each one of the one or more sentences is a potential material fact sentence or a non-material fact sentence based on one or more features of the sentence, and identifying, by the processing device, one or more potential material fact sentences from the one or more sentences based on the determination.

In yet another embodiment, a method to identify potential material fact sentences in electronic legal documents obtained from electronic repositories includes obtaining, by a processing device, an electronic legal document from a repository and parsing, by the processing device, text within the electronic legal document to determine whether each one of one or more paragraphs in the legal document is a fact paragraph, a discussion paragraph, or an outcome paragraph based on at least one of a heading associated with the paragraph and one or more features of the paragraph. For each one of the one or more paragraphs that is a fact paragraph, the method also includes extracting, by the processing device, each one of one or more sentences in the fact paragraph, directing, by the processing device, a natural language parser to parse each one of the one or more sentences in the fact paragraph to determine a number of noun phrases and a number of verb phrases, extracting, by the processing device, one or more features selected from a number of dates, a number of time stamps, a number of monetary values, a number of lower court actions, a number of present court actions, a number of plaintiff actions, a number of defendant actions, a number of legal phrases, a number of legal concepts, a number of non-material fact words, and a number of non-material fact phrases from each one of the one or more sentences, scoring, by the processing device, each one of the one or more sentences based on the number of noun phrases, the number of verb phrases, and the one or more features, and determining, by the processing device, whether each one of the one or more sentences is a potential material fact sentence or a non-material fact sentence based on the scoring.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 11 depicts a flow diagram of an illustrative method of determining whether a fact sentence is a potential material fact sentence or a non-material fact sentence based on a trained model according to one or more embodiments shown or described herein.

DETAILED DESCRIPTION

Figure 1:
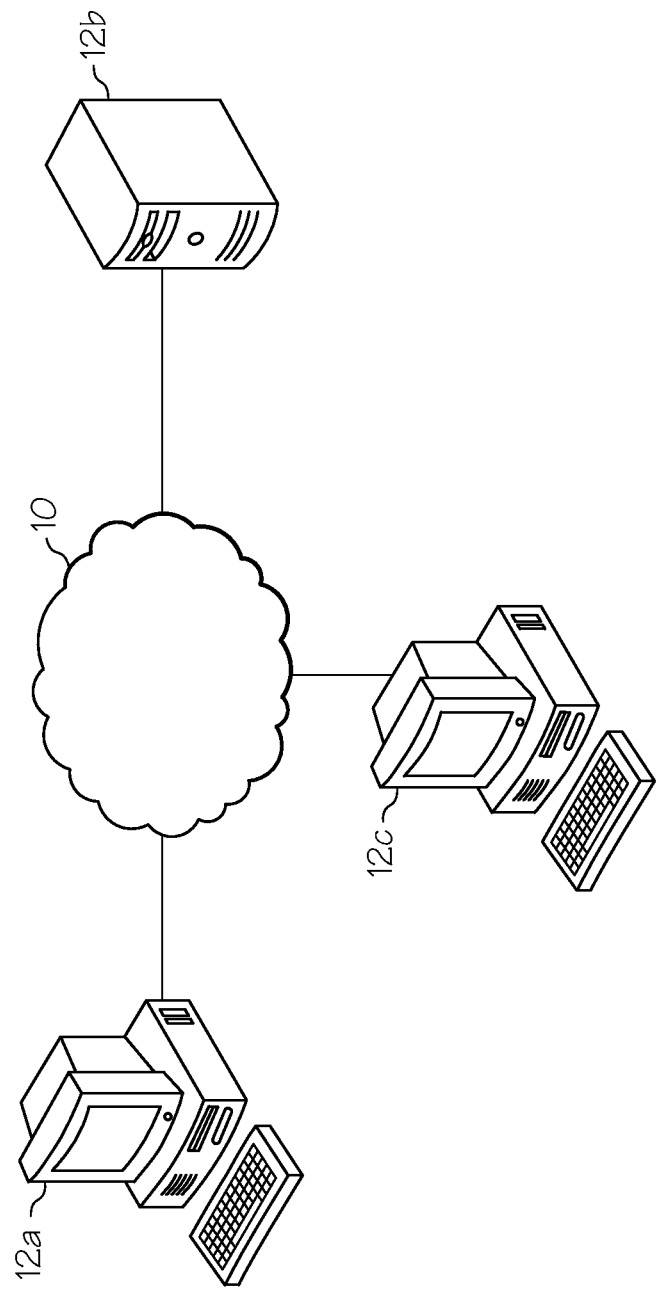
FIG. 1 depicts a schematic depiction of an illustrative computing network for a system for determining and extracting fact paragraphs and material facts therefrom according to one or more embodiments shown or described herein.

Previously, an individual researching case law had to manually search for reference cases related and/or pertinent to a case at hand, which was time consuming and oftentimes resulted in situations where the researcher did not discover every reference case related and/or pertinent to the case at hand. For example, certain reference cases may not have been apparent to the researcher as being pertinent or related to the case at hand because the reference case discussed many different issues, and some issues may be wholly unrelated to the case at hand while other issues are related. In other example, certain reference cases may not have been apparent to the researcher as being pertinent or related to the case at hand because the researcher simply did not discover it due to the increasingly large number of cases available for searching. In yet another example, a researcher may not discover a reference case because it is only available in electronic form.

The advent of computers and network-connected devices has been particularly suited to combat this issue because computers are capable of processing large amounts of data to accurately provide any and all information to a researcher. However, the increasingly large amounts of data may be unwieldy to a researcher, who may be overwhelmed and may nevertheless fail to discover certain reference cases. As such, it may become important for systems and methods that are specifically configured to take this data that did not exist before the advent of computers and network-connected devices, and make intelligent determinations about the data within the context of a researcher's search requirements to return information pertinent to the researcher, thereby avoiding the issues associated with a researcher overlooking or failing to consider reference cases related to the case at hand.

Referring generally to the figures, embodiments described herein are directed to systems and methods for automatically detecting potential material facts in electronic documents and/or data culled from the electronic documents, particularly electronic legal documents such as opinions, pleadings, complaints, and/or the like. Embodiments of the present disclosure locate fact paragraphs and determine particular sentences in the fact paragraphs that are likely to contain material facts, as opposed to non-material facts, opinions, and/or the like.

The methods and systems disclosed herein may be used, for example, in instances where an automated search and/or categorization tool is used to assist a document reviewer in reviewing pertinent portions of an electronic document and help a document reviewer discover electronic documents and/or data containing pertinent information. For example, an attorney reviewing or searching for case law may have a large number of cases to review to determine whether the cases are relevant to an issue at hand, how the cases are relevant, whether they provide precedential or non-precedential information or rulings, and/or the like. Because of the large number of cases or data obtained from the cases, it may be difficult or lengthy to review each case in detail to determine the pertinent information. As such, an automated search and/or categorization tool that is able to "review" the document for the attorney would be useful in determining where the pertinent information is within a document and displaying and/or highlighting the pertinent information for the attorney so that the attorney has the option to skip all of the other non-pertinent information. As a result, the attorney can spend more time focusing on the necessary information and skipping the non-necessary information to efficiently review all of the cases in a reasonable amount of time. As a result, in some instances, clients may be billed less time for the attorney's review.

In the various embodiments described herein, a classification framework based on data mining software quickly generates classifier models from training data files. The users of the framework do not need any expertise in the classification algorithm(s) used. Rather, the framework allows users to specify various properties, such as the classifiers (or committee of classifiers along with base classifiers), as well as the location of training and test data files. Unless otherwise stated, the training and test data files are assumed to be string type such that the text can be converted to numeric features, as described in greater detail herein. In some embodiments, users can also specify the attribute set and a Java preprocessor class to derive the values of the attributes from the training/test data.

The framework generates a model for the training data using the named classifiers. The model is then tested with the test data and the top few classes for each of the classifiers for each test instance is written to a truth table. Towards the end of the results file, the overall accuracy of the classifiers is presented. A user may view the results in the truth table and either accept the generated classifier model or modify the feature set to improve the accuracy. The framework can keep track of the major/minor version of a user's experiments automatically.

The framework may be made available as a web application for use by others. This will allow anyone to mine their data using the machine learning algorithms, without ever needing to write a single line of program code. When a user is satisfied with the generated classifier model's accuracy, the user can click a button to make the classifier available as a web service. Thereafter, the model can be used to accurately determine fact paragraphs, as well as potential material fact sentences and/or non-material fact sentences contained therein.

As used herein, the term "electronic documents" refers to documents that are available in electronic form. In some embodiments, an electronic document may be only available in electronic form. That is, the document may not generally be available in a physical form. For example, certain legal documents may be available via an electronic reporter, but are otherwise unavailable in a printed form. As such, the electronic document can only be accessed as data via a computing device (such as the computing devices described herein) to obtain the information contained therein. All references to a "document" or "documents" herein is meant to encompass electronic documents and data obtained from electronic documents.

A "citator" is a tool that helps a researcher determine the status of reference such as a case, a statute, or a regulation (e.g., determine whether the reference represents valid law) by finding documents that cite to that particular reference. In some embodiments, a citator may be referred to as a citation index. An illustrative citator may produce citation chains for a reference by listing how the reference was treated by a subsequent reference, such as, for example, by listing whether reference was overruled, followed, distinguished, and/or the like.

A "material fact" refers to a fact that is germane to a reasonable person in deciding whether to engage in a particular transaction, issue, or matter at hand. That is, a material fact is a fact in which expression or concealment of that fact would materially alter a reasonable result therefrom, and thus is important, significant, or essential to a reasonable person. In contrast, other facts may be factual, but are not germane to an issue at hand, such as unimportant, immaterial, or trivial facts. In the instance of case law, material facts are facts that are consequential to the resolution of a dispute. As such, the material facts are a subset of the facts of a case and are typically paraphrased in the analysis of underlying issues of the case.

Embodiments of the present disclosure are directed to potential material fact sentences that describe the "who, what, when, where and how" of a dispute. Material facts as defined in legal context are a subset of potential material facts. Since potential material fact sentences are the only sentences that are of interest, all other types of sentences are considered non-material fact sentences. In other words, only a binary classifier is needed to classify a sentence as potential material fact or not. Thus, "potential material fact sentences" and "material fact sentences" may be used interchangeably herein.

Referring now to the drawings, FIG. 1 depicts an illustrative computing network that depicts components for a system for determining fact paragraphs in electronically-available documents and extracting material fact sentences therefrom, according to embodiments shown and described herein. As illustrated in FIG. 1, a computer network 10 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 10 may generally be configured to electronically connect one or more computing devices and/or components thereof. Illustrative computing devices may include, but are not limited to, a user computing device 12a, a server computing device 12b, and an administrator computing device 12c.

The user computing device 12a may generally be used as an interface between the user and the other components connected to the computer network 10. Thus, the user computing device 12a may be used to perform one or more user-facing functions, such as receiving one or more inputs from a user or providing information such as potential material fact sentences to the user, as described in greater detail herein. Additionally, included in FIG. 1 is the administrator computing device 12c. In the event that the server computing device 12b requires oversight, updating, or correction, the administrator computing device 12c may be configured to provide the desired oversight, updating, and/or correction. The administrator computing device 12c may also be used to input additional data into a data storage portion of the server computer device 12b.

The server computing device 12b may receive electronic data, such as electronic documents and/or the like, from one or more sources, determine fact paragraphs and material fact sentences in the data, and provide information from certain portions of the data (e.g., material facts) to the user computing device 12a.

It should be understood that while the user computing device 12a and the administrator computing device 12c are depicted as personal computers and the server computing device 12b is depicted as a server, these are nonlimiting examples. More specifically, in some embodiments, any type of computing device (e.g., mobile computing device, personal computer, server, etc.) may be used for any of these components. Additionally, while each of these computing devices is illustrated in FIG. 1 as a single piece of hardware, this is also merely an example. More specifically, each of the user computing device 12a, server computing device 12b, and administrator computing device 12c may represent a plurality of computers, servers, databases, components, and/or the like.

In addition, it should be understood that while the embodiments depicted herein refer to a network of computing devices, the present disclosure is not solely limited to such a network. For example, in some embodiments, the various processes described herein may be completed by a single computing device, such as a non-networked computing device or a networked computing device that does not use the network to complete the various processes described herein.

Figure 2:
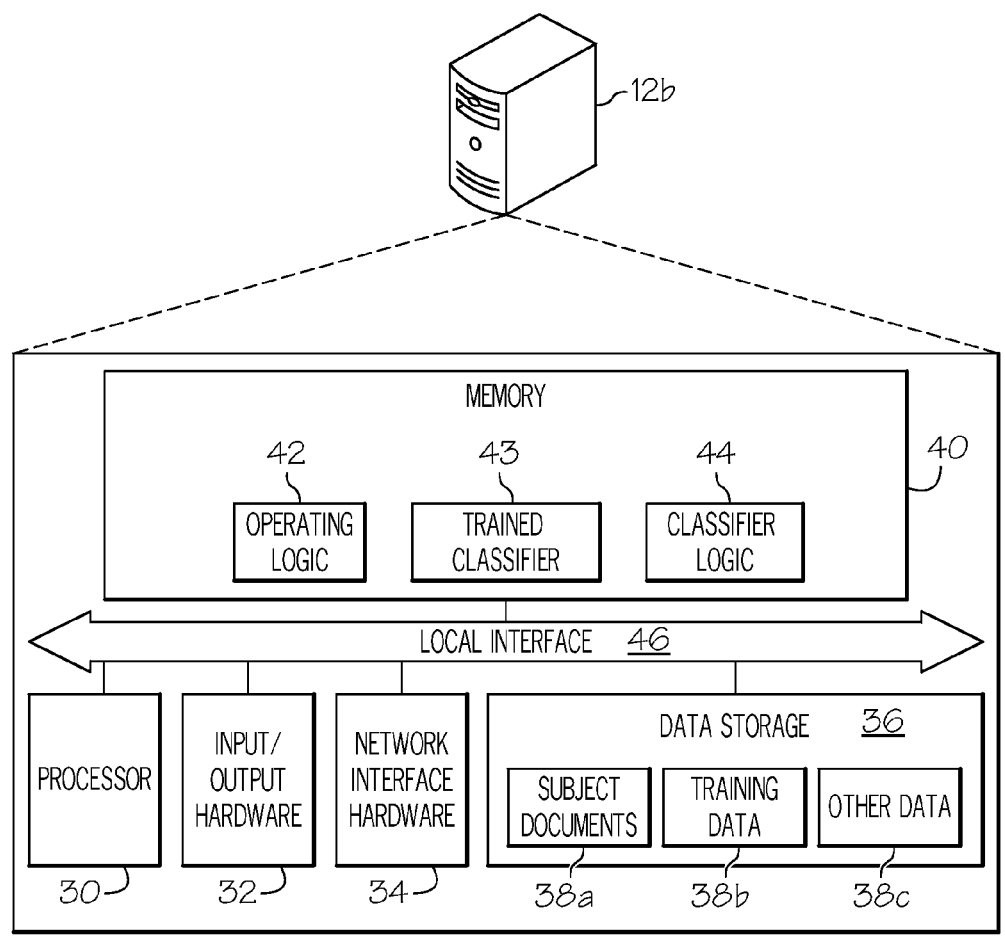
FIG. 2 depicts a schematic depiction of the server computing device from FIG. 1, further illustrating hardware and software that may be used in determining and extracting fact paragraphs and material facts therefrom according to one or more embodiments shown or described herein.

FIG. 2 depicts the server computing device 12b, from FIG. 1, further illustrating a system for determining fact paragraphs and potential material fact sentences in electronic documents. In addition, the server computing device 12b may include a non-transitory, computer-readable medium for searching a document corpus or determining facts and/or material facts embodied as hardware, software, and/or firmware, according to embodiments shown and described herein. While in some embodiments the server computing device 12b may be configured as a general purpose computer with the requisite hardware, software, and/or firmware, in some embodiments, the server computing device 12b may also be configured as a special purpose computer designed specifically for performing the functionality described herein. For example, the server computing device 12b may be a specialized device that is functional only to determine fact paragraphs and potential material fact sentences located within those fact paragraphs from electronic documents. In a further example, the server computing device 12b may be a specialized device that further generates electronic documents for the determination of fact paragraphs and potential material fact sentences therein. The electronic documents may be generated from data obtained from other computing devices, such as data obtained over the Internet, data obtained from hard copy documents via optical imaging and/or optical character recognition (OCR), and/or the like.

As also illustrated in FIG. 2, the server computing device 12b may include a processor 30, input/output hardware 32, network interface hardware 34, a data storage component 36 (which may store subject documents 38a, training data 38b, and other data 38c), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42, a trained classifier 43 (including a trained paragraph classifier and/or a trained sentence classifier), and classifier logic 44 (each of which may be embodied as a computer program, firmware, or hardware, as an example). A local interface 46 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data, determine fact paragraphs, and/or determine material fact sentences from the fact paragraphs. As illustrated in FIG. 2, the data storage component 36 may store subject documents 38a, training data 38b, and other data 38c, as described in greater detail herein.

Included in the memory component 40 are the operating logic 42, the trained classifier 43, and the classifier logic 44. The operating logic 42 may include an operating system and/or other software for managing components of the server computing device 12b. The trained classifier 43 may include one or more software modules for training the server computing device 12b to recognize fact paragraphs and potential material fact sentences in the fact paragraphs. In some embodiments, the trained classifier 43 may be two separate classifiers: a trained paragraph classifier that identifies fact paragraphs, and a trained sentence classifier that identifies potential material fact sentences. In other embodiments, the trained classifier may be a single classifier that identifies fact paragraphs and also identifies potential material fact sentences. Accordingly, it should be understood that the terms "trained classifier," "trained paragraph classifier," and "trained sentence classifier" may be used interchangeably. The classifier logic 44 may include one or more software modules for classifying portions of electronic documents.

It should be understood that the components illustrated in FIG. 2 are merely illustrative and are not intended to limit the scope of this disclosure. More specifically, while the components in FIG. 2 are illustrated as residing within the server computing device 12b, this is a nonlimiting example. In some embodiments, one or more of the components may reside external to the server computing device 12b. Similarly, while FIG. 2 is directed to the server computing device 12b, other components such as the user computing device 12a and the administrator computing device 12c may include similar hardware, software, and/or firmware.

Figure 3:
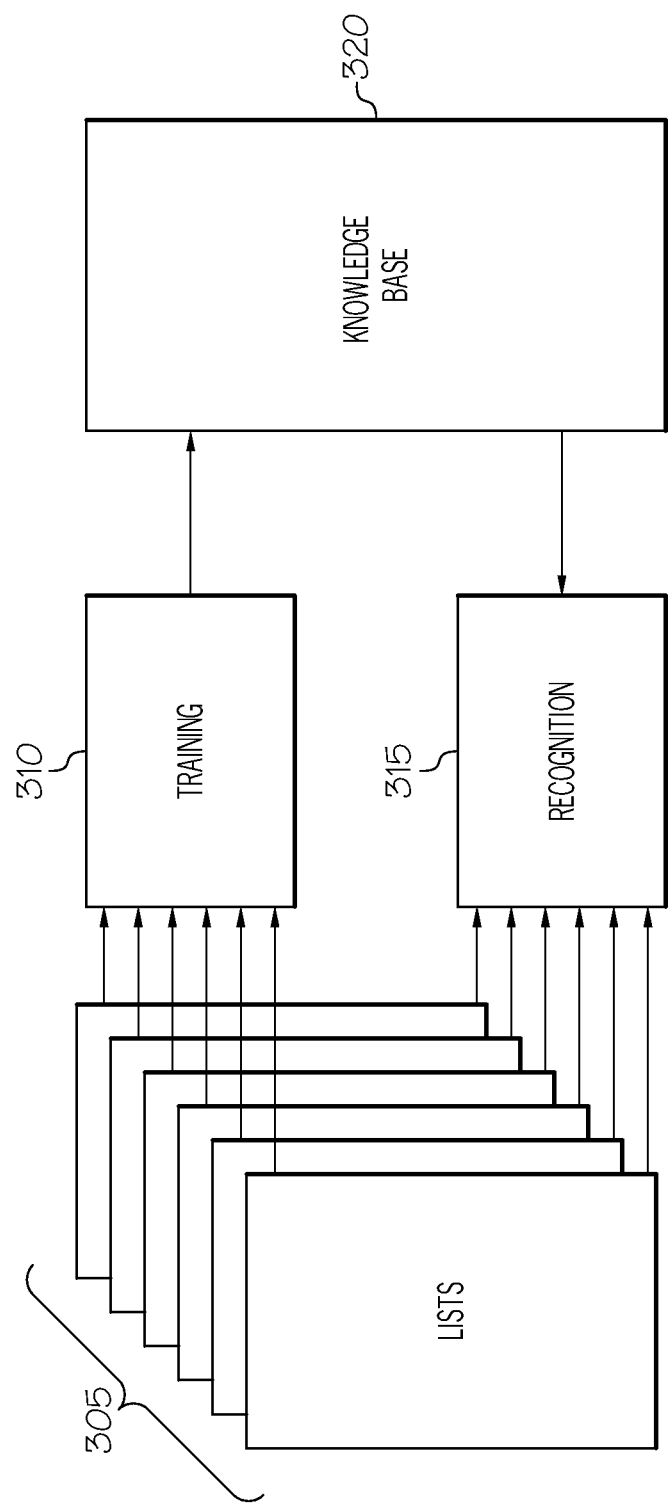
FIG. 3 depicts a high-level flow diagram of illustrative training and recognition processes according to one or more embodiments shown or described herein.

FIG. 3 depicts a high level flow diagram of illustrative training and recognition processes. As shown in FIG. 3, a learning algorithm is first trained (in a training process 310) before it recognizes the distinction between fact and discussion paragraphs, as well as potential material fact sentences and non-material fact sentences within fact paragraphs (in a recognition process 315). A knowledge base 320 is used to store training results in the training process 310 for use in the recognition process 315. The knowledge base 320 may be, for example, the training data 38b of the data storage component 36 (FIG. 2) described herein.

The training process 310 and the recognition process 315 make use of a set of various lists and format definitions 305. The lists may include, but are not limited to, those illustrated in Appendix A through Appendix M herein. The format definitions may include, for example, case cite formats, statute cite formats, date formats, and/or the like. It should be understood that the various lists and format definitions described herein are merely illustrative, and other lists (including terms thereof) and format definitions are not limited by the present disclosure.

Figure 4:
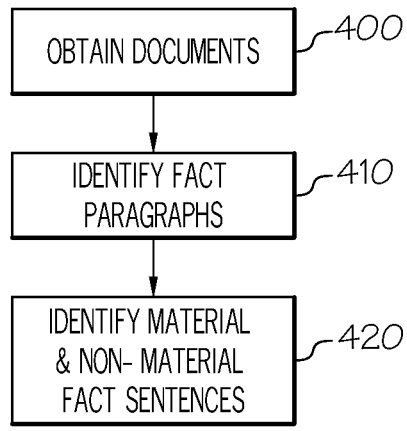
FIG. 4 depicts a flow diagram of an overall process for determining material facts from fact paragraphs according to one or more embodiments shown or described herein.

FIG. 4 depicts the overall process for determining potential material fact sentences in fact paragraphs. As shown in FIG. 4, the process includes obtaining the documents in step 400, identifying the fact paragraphs in step 410, and identifying potential material fact sentences and non-material fact sentences in step 420.

Obtaining documents, as shown in step 400, may generally include retrieving documents from a repository. For example, the documents may be obtained from the subject documents 38a of the data storage component 36 (FIG. 2) as described in greater detail herein. In other embodiments, the documents may be obtained from an offsite data storage repository, such as an electronic document publisher's repository and/or the like. The documents are generally electronic documents and may generally contain information arranged in paragraph form. In some embodiments, the documents may be legal documents, such as, for example, pleadings, declarations, deposition transcripts, expert reports, trial transcripts, motions, briefs, expert reports, legal memos, documents produced by a plaintiff in the legal matter, documents produced by a defendant in the legal matter, contracts, patents, transactional documents, real estate documents, and/or the like.

In lieu of or in addition to obtaining electronic documents, data may be retrieved from the repository. For example, data may be obtained that contains information that has been generated from documents for the purposes of processing to determine fact paragraphs and/or potential material fact sentences therein. In some embodiments, the data may be raw data that was generated as a result of one or more computing devices scanning and retrieving information from electronic documents.

Figure 5:
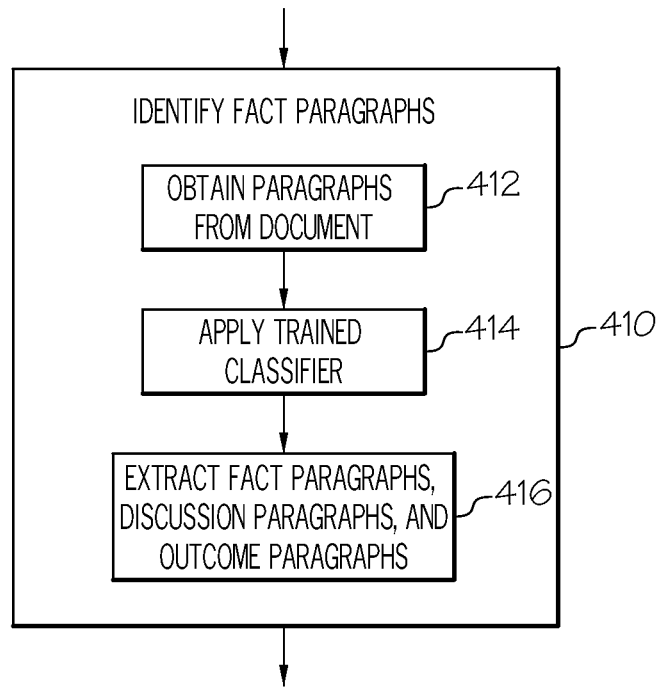
FIG. 5 depicts a flow diagram of an illustrative method of identifying fact paragraphs according to one or more embodiments shown or described herein.

In step 410, each document that is obtained is analyzed to identify fact paragraphs in the document. FIG. 5 depicts a detailed flow diagram of such an identification. As shown in FIG. 5, the paragraphs in the document are obtained in step 412. The paragraphs are generally obtained by parsing the document to determine a beginning and an end for each paragraph therein. For example, a beginning of a paragraph may be indicated by the first word after a paragraph number identifier, the first word after a hard return, the first word after a soft return, a first word after a heading, the first word of the document, and/or the like. Similarly, an end of a paragraph may be indicated by a hard return, a soft return, the last word of the document, the last word before a heading, and/or the like.

Figure 6:
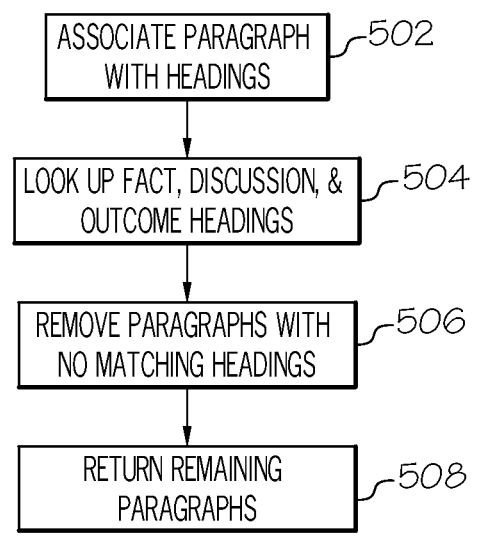
FIG. 6 depicts a flow diagram of an illustrative method of training a fact paragraph classifier according to one or more embodiments shown or described herein.

After the fact paragraphs have been obtained in step 412, a trained paragraph classifier is applied in step 414 to extract fact paragraphs, discussion paragraphs, and outcome paragraphs in step 416. That is, in step 414, the trained paragraph classifier is used to categorize each paragraph in the document as a fact paragraph, a discussion paragraph, or an outcome paragraph. The trained paragraph classifier is particularly trained to analyze each paragraph and categorize it based on certain features of the paragraph (i.e., headings that precede the paragraph), certain phrases used in the paragraph, and/or the like. For example, as shown in FIG. 6, the trained paragraph classifier may associate each paragraph with any headings that precede the paragraph in step 502. That is, the paragraphs that follow a heading up to, but not including, the next heading are stored in a memory and indexed by the text of the heading (e.g., headings shown in Appendix A, Appendix B, and Appendix C). In addition, each paragraph may be sequentially numbered starting at zero (without regard to the headings) and a total count of paragraphs in the opinion is stored. As shown in step 504, the various headings of the document are "looked up" by comparing the headings with a list of known and categorized headings for a document, such as, for example, the fact headings listed in Appendix A, the discussion headings listed in Appendix B, and/or the outcome headings listed in Appendix C. If the heading matches a known and categorized heading from the list, the heading (and the associated paragraphs) may be categorized accordingly (e.g., as a fact heading/paragraph, a discussion heading/paragraph, a outcome heading/paragraph, etc.). If the heading does not match a heading from any list, the heading and the associated paragraph(s) are removed from consideration in step 506. For example, the non-matching heading and associated paragraph(s) may be deleted from the document, marked as ignored, hidden, and/or the like. In step 508, the remaining paragraphs and headings may be returned as classified headings/paragraphs for use during the fact paragraph identification processes.

It should be understood that in some instances, a document may not contain headings and/or may contain paragraphs that are not associated with a particular heading. However, the paragraphs may still be classified according to the steps described with respect to FIG. 6. That is, a paragraph may be identified as a fact paragraph, a discussion paragraph, or an outcome paragraph based on particular words and/or phrases. Illustrative words and phrases may be similar to those found in Appendix A, Appendix B, and Appendix C, respectively, or may be other words or phrases that are commonly associated with fact paragraphs, discussion paragraphs, and outcome paragraphs.

Figure 7:
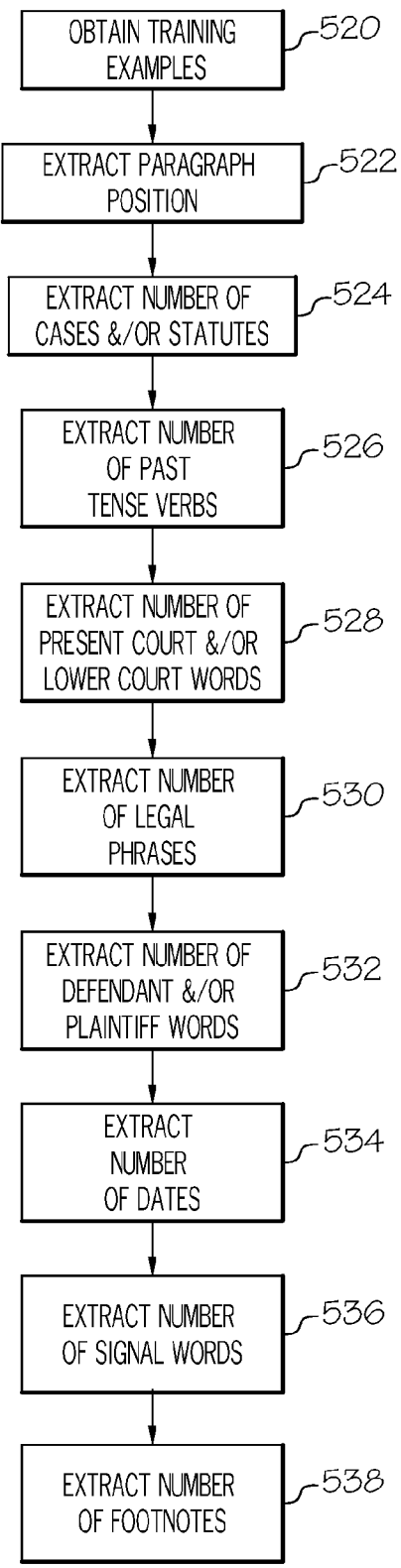
FIG. 7 depicts a flow diagram of an illustrative method of determining one or more features for fact, discussion, and outcome paragraph classification according to one or more embodiments shown or described herein.

In addition to particular words and/or phrases, certain other features such as word type, paragraph structure, and/or paragraph arrangement may also be used to determine whether the paragraph is a fact paragraph, a discussion paragraph, or an outcome paragraph. For example, FIG. 7 depicts a flow diagram of a method of determining the features of a paragraph. As shown in FIG. 7, training examples may be obtained in step 520. The training examples may be obtained, for example, from a repository, such as the data storage component 36 (FIG. 2). The training examples may be illustrative examples of fact paragraphs, discussion paragraphs, and outcome paragraphs that have been learned by the trained paragraph classifier. The training examples may include certain features of a paragraph such as, but not limited to, position of the paragraph with respect to other paragraphs, case cites, statute cites, past-tense verbs, dates, signal words, references to the court that provided the document ("present court"), references to a lower court that ruled on a case before it arrived to the present court, such as via an appeal ("lower court"), references to a defendant, references to a plaintiff, and legal phrases.

In step 522, the paragraph position may be extracted. The paragraph position may generally refer to the position of the paragraph within the document. For example, the paragraph may be the first paragraph in the document, the fourth paragraph in the document, the last paragraph in the document, or the like. In addition, the paragraph position may be relative to other paragraphs in the document. For example, a paragraph may be located between a first paragraph that has been identified as a discussion paragraph and a second paragraph that has been identified as a outcome paragraph. In some embodiments, the position of the paragraph may be expressed as a relative position P that equals the paragraph number within the document E divided by the total number of paragraphs T found in the document. For example, a fourth paragraph of a document containing 17 paragraphs would have a relative position P of 4/17. In some embodiments, P may be stored in memory as a floating-point number with the paragraph as a position parameter for one or more learning algorithms.

In step 524, the number of cases and/or statutes may be extracted from the paragraph. The number of cases and statutes refers to the total number of other cases (e.g., a paragraph that has the text "Roe v. Wade, 410 U.S. 113 (1973)") or statutes (e.g., a paragraph that has the text "35 U.S.C. § 101") that are referred to in the paragraph. For example, a paragraph that references three different cases and one statute would have a total number of four. In addition to the number of cases and statutes, the case name/citation (e.g., Roe v. Wade, 410 U.S. 113 (1973)) and statute citation (35 U.S.C. § 101) may also be extracted and recorded. In some embodiments, the count of the cases and/or statutes in a paragraph may be stored in memory as a cite parameter, a statute parameter, or a combination cite/statute parameter for one or more learning algorithms.

In step 526, the number of past tense verbs may be extracted from the paragraph. That is, the paragraph may be parsed such that a determination is made as to whether each word in the paragraph is a past tense verb, as well as the number of occurrences thereof. A determination of whether a particular word is a verb may be completed by an language parser module that is particularly configured to automatically determine whether a word is a past tense verb. Illustrative past tense words appear in Appendix D. In some embodiments, the total number of past tense verbs may be stored in memory as a past tense verb parameter for one or more learning algorithms.

In step 528, the number of present court and lower court words and/or phrases may be extracted from the paragraph. That is, the paragraph may be parsed such that a determination is made as to whether each word or phrase in the paragraph is a present court word/phrase or a lower court word/phrase, as well as the number of occurrences thereof. Such a determination may be completed by comparing each word or phrase in the paragraph with a lower court list and/or a present court list. Illustrative present court words and/or phrases may include, but are not limited to, the words and phrases that appear in Appendix F. Illustrative lower court words and/or phrases may include, but are not limited to, the words and phrases that appear in Appendix G. In some embodiments, the number of present court and lower court words and/or phrases may be stored in memory as a present court parameter, a lower court parameter, or a combined present court/lower court parameter for one or more learning algorithms.

In step 530, the number of legal phrases may be extracted from the paragraph. That is, the paragraph may be parsed such that a determination is made as to whether the words in the paragraph constitute a legal phrase, as well as the number of occurrences thereof. Such a determination may be completed by comparing each phrase with a legal phrase list. Illustrative legal phrases may include, but are not limited to, the legal phrases that appear in Appendix J. In some embodiments, the number may correspond to the total number of phrases. In other embodiments, the number may correspond to the total number of words. In some embodiments, the number of legal phrases may be stored in memory as a legal phrase parameter for one or more learning algorithms.

In step 532, the number of defendant and plaintiff words may be extracted from the paragraph. That is, the paragraph may be parsed such that a determination is made as to whether each word is a defendant word or a plaintiff word, as well as the number of occurrences thereof. Such a determination may be completed by comparing each word with a defendant word list and/or a plaintiff word list. Illustrative defendant words may include, but are not limited to, the defendant words that appear in Appendix H. Illustrative plaintiff words may include, but are not limited to, the plaintiff words that appear in Appendix I. In some embodiments, the number of defendant words may be stored in memory as a defendant parameter, the number of plaintiff words may be stored in memory as a plaintiff parameter, and/or the total number of defendant and plaintiff words may be stored in memory as a combined defendant/plaintiff parameter for one or more learning algorithms.

In step 534, the number of dates may be extracted from the paragraph. That is, the paragraph may be parsed such that a determination of whether a date appears in the paragraph, as well as the number of occurrences thereof. The date may be in any generally recognized date form, such as, for example, September 8, 1981, Sept. 8, 09/08/1981, 9/8/1981, 8 Sept., or the like. In some embodiments, the number of dates that are extracted may be stored in memory as a date parameter for one or more learning algorithms.

In step 536, the number of signal words may be extracted from the paragraph. That is, the paragraph may be parsed such that a determination is made as to whether each word constitutes a signal word, as well as the number of occurrences thereof. Such a determination may be made by comparing each word to a signal word list. Illustrative signal words may include, but are not limited to, the signal words that appear in Appendix E. In some embodiments, the number of signal words may be stored in memory as an issue parameter for one or more learning algorithms.

In step 538, a number of footnotes may be extracted from the paragraph. That is, the paragraph may be parsed such that a determination is made as to whether any of the words contain a reference to a footnote (e.g., a superscript indicator appearing immediately after a word), as well as the number of occurrences thereof. In some embodiments, the number of footnotes may be stored in memory as a footnote parameter for one or more learning algorithms.

In various embodiments, additional features may be extracted from the paragraph. For example, in some embodiments, a number of present tense verbs may be extracted from the paragraph. That is, the paragraph may be parsed such that it determines whether each word is a present tense verb by comparing the words to a present tense verb list and determining the number of occurrences thereof. Illustrative present tense verbs may include, but are not limited to, the words that appear in Appendix K. In another example, the paragraph text may be used to find additional features, such as by converting paragraph attributes into a set of attributes representing word occurrence information. Illustrative commercial products may include StringToWordVector, ChiSquaredAttributeEval, and Ranker, all of which are available from Weka (University of Waikato, New Zealand). Although embodiments of the present disclosure are described in the context of the open source machine learning software available from Weka, embodiments are not limited thereto. Other non-limiting machine learning software that may be used includes, but is not limited to, RapidMiner (RapidMiner, Inc., Cambridge, Mass.), R programming language, IBM Statistical Package for Social Sciences ("IBM SPSS") (International Business Machines Corporation, Armonk, N.Y.), and Statistical Analysis System ("SAS") (SAS Institute, Cary, N.C.).

In some embodiments, the various parameters that are extracted from the paragraph as described hereinabove may be used in one or more algorithms for learning and later determining whether the paragraph is a fact paragraph, a discussion paragraph, or a outcome paragraph. For example, the parameters may be used in a support vector machine, a decision tree learning model, and a naïve Bayes classifier. In addition, a stacking committee of classifiers may be used, with a logistic regression model as a top level meta-classifier. It should generally be understood that a support vector machine is a supervised learning model with associated learning algorithms that can analyze the data obtained from the paragraphs and recognize patterns that are used to classify the paragraph. It should also be generally understood that decision tree learning is a predictive model that maps observations about an item to conclusions about the item's target value. It should also be generally understood that a naïve Bayes classifier includes any one of the family of simple probabilistic classifiers that is based on applying the Bayes' theorem with strong independence assumptions between features. Additional description of these classifiers is provided herein with respect to training and recognition of potential material fact sentences.

Referring again to FIG. 5, the paragraphs that are returned by the trained paragraph classifier are extracted according to their categorization in step 416. That is, the paragraphs that are associated with a heading that has been classified as a fact heading are extracted as fact paragraphs, the paragraphs that are associated with a heading that has been classified as a discussion heading are extracted as discussion paragraphs, and the paragraphs that are associated with a heading that has been classified as an outcome paragraphs. In addition, the paragraphs that contain features that have been classified as fact are extracted as fact paragraphs, the paragraphs that contain features that have been classified as discussion are extracted as discussion paragraphs, and the paragraphs that contain features that have been classified as outcome are extracted as outcome paragraphs. For the purposes of further categorization of potential material fact sentences and non-material fact sentences, only the fact paragraphs are used.

Thus, the discussion and outcome paragraphs are not used for the purposes of determining material fact sentences and non-material fact sentences.

Figure 8:
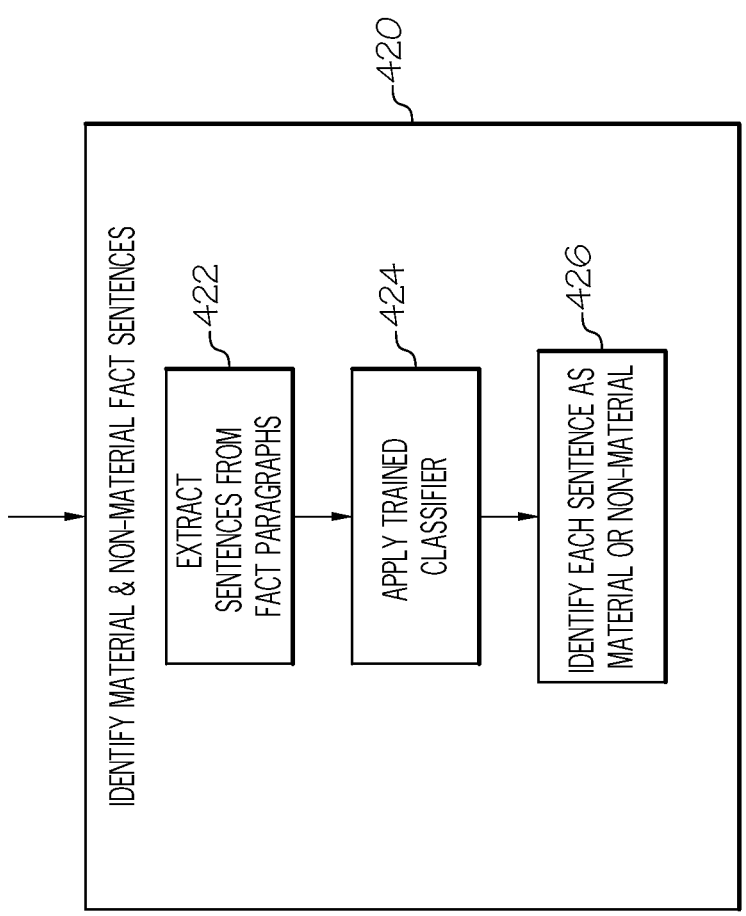
FIG. 8 depicts a flow diagram of an illustrative method of identifying material and non-material fact sentences within a fact paragraph according to one or more embodiments shown or described herein.

Referring again to FIG. 4, in step 420, material fact sentences and non-material fact sentences are identified from the fact paragraphs. Step 420 is described in further detail with respect to FIG. 8. As shown in FIG. 8, the sentences are extracted from the fact paragraphs. The sentences may be extracted by identifying a beginning and an end for each sentence, determining the location of the sentence within the paragraph, determining the number of words in the sentence, determining the types of words in the sentence, determining the arrangement of the words in the sentence, generating data relating to the beginning and end of the sentence, the location of the sentence, the number of words, the type of words, the arrangement of the words, and storing the data to memory. The beginning of a sentence may be identified based on capitalization of the first letter of a word, whether a period precedes a word, whether a soft return or a hard return precedes the word, and/or the like. The end of a sentence may be identified based on the location of a period, the location of a soft return, the location of a hard return, and/or the like. For example, a sentence may be identified by starting at the beginning of the fact paragraph and ending once the first period is reached, and then determining whether the first period is subsequent to an abbreviation (e.g., "corp."). If the first period is not subsequent to an abbreviation, the sentence may be determined to have ended. If the first period is subsequent to an abbreviation, the sentence may be further parsed until the next period has been reached and another determination has been made whether the word preceding the sentence is an abbreviation. Once the start and stop points of the sentence have been determined, the number of words may be counted, along with the type of each word (e.g., a noun, a past tense verb, a present tense verb, a future tense verb, a pronoun, an adjective, an adverb, a preposition, a conjunction, an interjection, and/or the like). The type of each word may be determined by a natural language parser module that has been particularly designed to automatically determine each word type, as described in greater detail herein.

In step 424, a trained sentence classifier may be applied to determine whether each sentence is a potential material fact sentence or a non-material fact sentence such that the sentence can be identified in step 426. A trained sentence classifier may be trained to recognize each sentence as material or non-material. Training of the trained sentence classifier is described in greater detail herein with respect to FIGS. 9 and 10.

Figure 9:
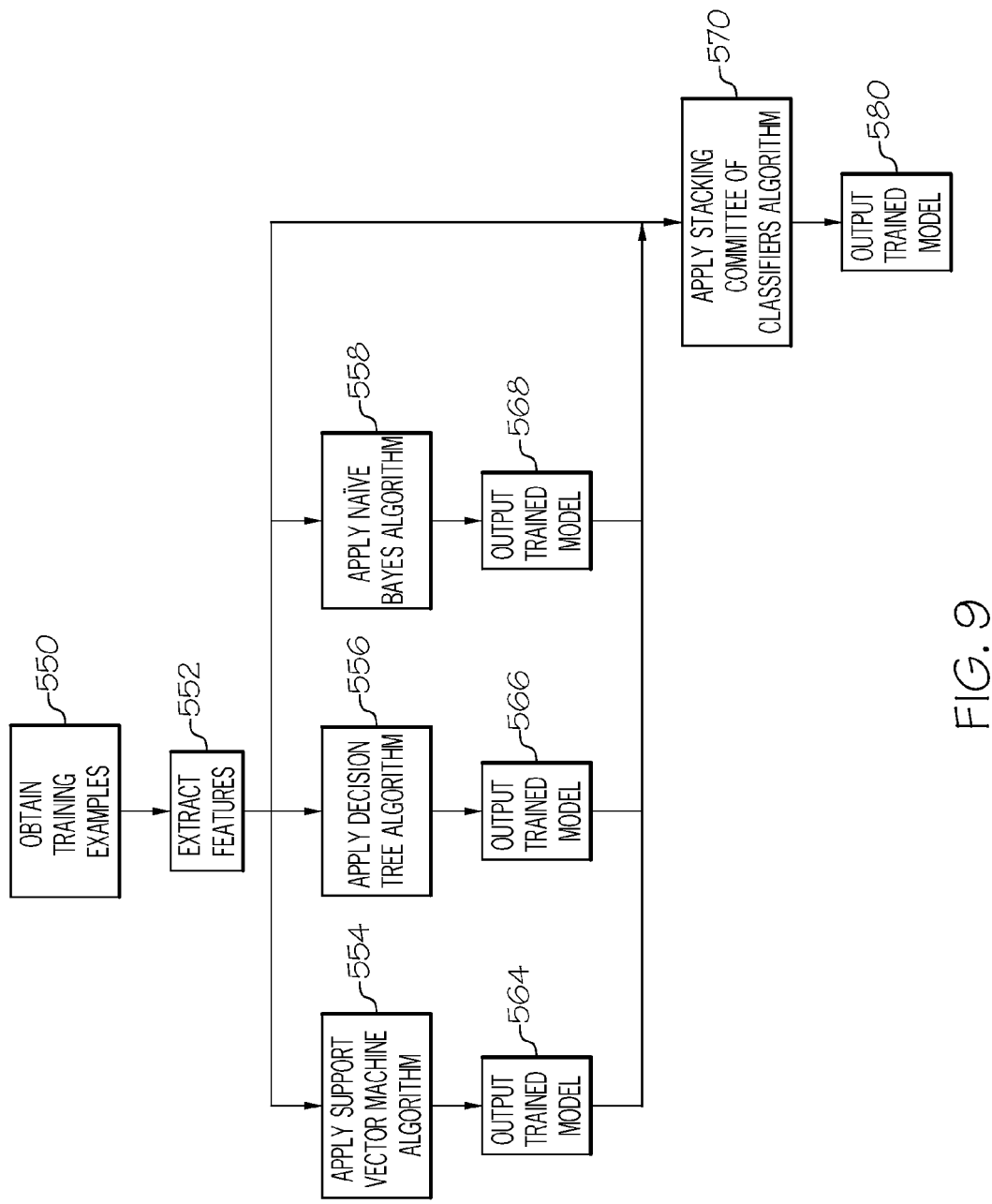
FIG. 9 depicts a flow diagram of an illustrative method of generating trained models according to one or more embodiments shown or described herein.

As shown in FIG. 9, training examples of material and/or non-material fact sentences may be obtained in step 550. The training examples may be obtained, for example, from a repository, such as the data storage component 36 (FIG. 2). The training examples may be illustrative examples of material fact sentences and/or non-material fact sentences that have been previously learned by the trained sentence classifier and/or provided by a legal editor. For example, a legal editor may label each sentence of one or more fact paragraph as being either a material fact sentence or a non-material fact sentence, and then certain attributes of the labeled sentences can be analyzed to determine how the sentences are material fact sentences or non-material fact sentences. Illustrative attributes may include, but are not limited to, noun phrases, verb phrases, dates and/or timestamps, monetary values, lower court actions, present court actions, plaintiff actions, defendant actions, and legal phrases and/or legal concepts.

Figure 10:
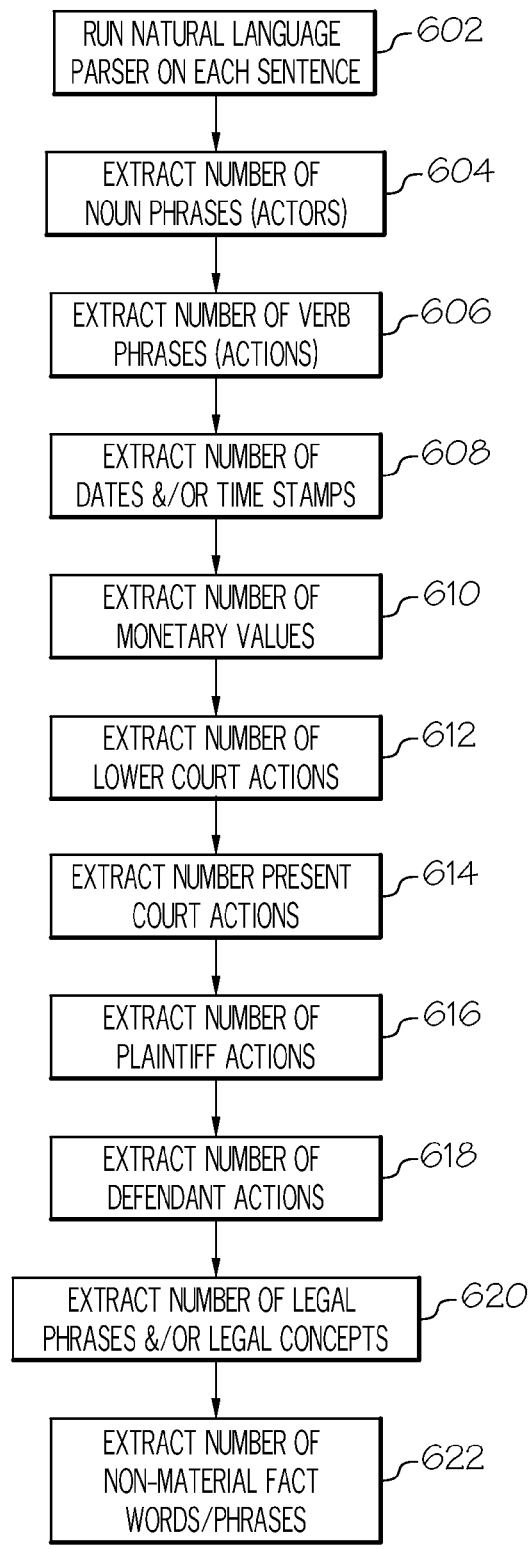
FIG. 10 depicts a flow diagram of an illustrative method of determining one or more features for material fact and non-material fact sentence classification according to one or more embodiments shown or described herein.

In step 552, various features may be extracted from the sentences of a fact paragraph. In some embodiments, the features may be extracted in a manner similar to the method for extracting paragraph features, as shown and described herein with respect to FIG. 7. In some embodiments, the features may be extracted as shown in FIG. 10. In step 602, a natural language parser module may be run on each sentence within the fact paragraph. It should generally be understood that a natural language parser module is a computer program that works out a grammatical structure of each sentence in the paragraph. For example, the natural language parser module may determine which groups of words go together (as "phrases") and which words are the subject or object of a verb. Certain probabilistic parsers may use knowledge of language gained from hand-parsed sentences to produce a most likely analysis of new sentences. One non-limiting example of a natural language parser module may be the Stanford parser, which is available from Stanford University at http://nlp.stanford.edu/software/tagger.shtml. The natural language parser module may be used such that various features described hereinbelow are recognized.

In step 604, the number of noun phrases are extracted from the sentence. That is, the language parser module is applied to the sentence such that the natural language parser module automatically determines the noun phrases, including words and/or phrases that represent the actor. The natural language parser module may then automatically return the noun phrases that are present in the sentence. Illustrative noun phrases may include, but are not limited to, the present court words/phrases that appear in Appendix F, the lower court words/phrases that appear in Appendix G, the defendant words that appear in Appendix H, and the plaintiff words that appear in Appendix I. In some embodiments, the number of noun phrases may be stored in memory as a noun phrase parameter for one or more learning algorithms.

In step 606, the number of verb phrases are extracted from the sentence. That is, the natural language parser module is applied to the sentence such that the natural language parser module automatically determines the verb phrases, including words and/or phrases that represent an action that is being completed, an action that has been completed, or an action that will be completed. The natural language parser module may then automatically return the verb phrases that are present in the sentence. Illustrative verb phrases may include, but are not limited to, the past tense verbs that appear in Appendix D and the present tense verbs that appear in Appendix K. In some embodiments, the number of verb phrases may be stored in memory as a verb phrase parameter for one or more learning algorithms.

In step 608, the number of dates and/or time stamps may be extracted from the sentence. That is, the sentence may be parsed such that a determination of whether a date and/or a time stamp appears in the sentence, as well as the number of occurrences thereof. The date may be in any generally recognized date form, such as, for example, Sep. 8, 1981, September 8, Sep. 8, 1981, Sep. 8, 1981, 8 September, or the like. The time stamp may be in any generally recognized time form, such as, for example 3:17 PM, 15:17:00, or the like. In some embodiments, the number of dates and/or time stamps that are extracted may be stored in memory as a date/time parameter for one or more learning algorithms.

In step 610, the number of monetary values may be extracted from the sentence. That is, the sentence may be parsed such that a determination of whether a monetary value appears in the sentence, as well as the number of occurrences thereof. The monetary value may be in any generally recognized format, such as, for example, fifty dollars, 50 dollars, $50.00, $50, fifty bucks, 50 bucks, or the like. In some embodiments, the number of monetary values that are extracted may be stored in memory as a monetary parameter for one or more learning algorithms.

In step 612, the number of lower court actions may be extracted from the sentence. That is, the sentence may be parsed such that a determination is made as to whether each noun word or noun phrase in the sentence is a lower court word/phrase, as well as the number of occurrences thereof. Such a determination may be completed by comparing each noun word or noun phrase in the sentence with a lower court list. Illustrative lower court words and/or phrases may include, but are not limited to, the words and phrases that appear in Appendix G. In some embodiments, the number of lower court actions may be stored in memory as a lower court action parameter for one or more learning algorithms.

In step 614, the number of present court actions may be extracted from the sentence. That is, the sentence may be parsed such that a determination is made as to whether each noun word or noun phrase in the sentence is a present court word/phrase, as well as the number of occurrences thereof. Such a determination may be completed by comparing each noun word or noun phrase in the sentence with a present court list. Illustrative present court words and/or phrases may include, but are not limited to, the words and phrases that appear in Appendix F. In some embodiments, the number of present court actions may be stored in memory as a present court action parameter for one or more learning algorithms.

In step 616, the number of plaintiff actions may be extracted from the sentence. That is, the sentence may be parsed such that a determination is made as to whether each word or phrase in the sentence is a plaintiff word/phrase and what the corresponding verb that represents the action of the plaintiff is, as well as the number of occurrences thereof. Such a determination may be completed by comparing each word or phrase in the sentence with a plaintiff list and then determining the corresponding verb to determine the action of the plaintiff. Illustrative plaintiff words and/or phrases may include, but are not limited to, the words and phrases that appear in Appendix I. Illustrative verbs include, but are not limited to, the past tense verbs that appear in Appendix D and the present tense verbs that appear in Appendix K. In some embodiments, the number of plaintiff actions may be stored in memory as a plaintiff action parameter for one or more learning algorithms.

In step 618, the number of defendant actions may be extracted from the sentence. That is, the sentence may be parsed such that a determination is made as to whether each word or phrase in the sentence is a defendant word/phrase and what the corresponding verb that represents the action of the defendant is, as well as the number of occurrences thereof. Such a determination may be completed by comparing each word or phrase in the sentence with a defendant list and then determining the corresponding verb to determine the action of the defendant. Illustrative defendant words and/or phrases may include, but are not limited to, the words and phrases that appear in Appendix H. Illustrative verbs include, but are not limited to, the past tense verbs that appear in Appendix D and the present tense verbs that appear in Appendix K. In some embodiments, the number of defendant actions may be stored in memory as a defendant action parameter for one or more learning algorithms.

In step 620, the number of legal phrases and/or legal concepts may be extracted from the sentence. That is, the sentence may be parsed such that a determination is made as to whether each word or phrase in the sentence is a legal phrase and/or a legal concept, as well as the number of occurrences thereof. Such a determination may be completed by comparing each word or phrase in the sentence with a legal word/legal phrase list. Illustrative legal words and/or legal phrases may include, but are not limited to, the legal phrases that appear in Appendix J. In some embodiments, the number of legal phrases and/or legal concepts may be stored in a memory as a legal phrase/concept parameter for one or more learning algorithms.

In step 622, the number of non-material fact words/phrases may be extracted from the sentence. That is, the sentence may be parsed such that a determination is made as to whether each word or phrase in the sentence is a non-material fact word and/or a non-material fact phrase, as well as the number of occurrences thereof. Such a determination may be completed by comparing each word or phrase in the sentence with a list of non-material fact words and/or phrases. Illustrative non-material fact words and non-material fact phrases may include, but are not limited to, the non-material fact words and phrases that appear in Appendix L. Illustrative non-material fact sentences may include, but are not limited to, the non-material fact sentences that appear in Appendix M.

Referring again to FIG. 9, data obtained from the extracted features from each sentence in the fact paragraph may be used in supervised learning such that a computing device (such as, for example, the server computing device 12b of FIG. 2) can be trained to recognize potential material fact sentences and distinguish them from non-material fact sentences. Supervised learning involves learning a model using the training data and testing the model using unseen data to assess the accuracy of the model. In some embodiments, a plurality of models may be trained using one or more learning algorithms for the base classifiers. Illustrative base classifiers may include, but are not limited to, a Probabilistic Naïve Bayesian classifier, a Vector Space partitioning Support Vector Machine, and a Boolean Function classifier Decision Tree. For example, a support vector machine algorithm may be applied in step 554, a decision tree algorithm may be applied in step 556, and/or a naïve Bayes algorithm may be applied in step 558. In addition, a stacking committee of classifiers algorithm may be applied in step 570 to teach a computing device to determine whether the sentence is a potential material fact sentence or a non-material fact sentence.

In step 554, the computing device may be trained to recognize potential material fact sentences from non-material fact sentences via a support vector machine algorithm. A Support Vector Machine (SVM) is a machine learning algorithm that can classify data into two categories (e.g., potential material facts and non-material facts). An SVM constructs a decision boundary (also called a hyperplane) that partitions the data into two groups. The hyperplane is constructed so that the distance between it and any data point on either side is maximized. That is, the SVM maximizes the margin between the partitioning hyperplane and all data points. The data points that are closest to the decision boundary are the ones that define the hyperplane and constrain the width of the margin. They can be thought of as "supporting" the hyperplane, and are thus called support vectors.

One feature of SVM is that it can model non-linear relationships between input and output variables via a kernel function. The kernel function may be represented by the following equation:

$$K(x, y) = \frac{\langle x, y \rangle^{2.0}}{((\langle x, x \rangle^{2.0})(\langle y, y \rangle^{2.0}))^{1/2}}$$

where x and y are the feature vectors corresponding to two training instances in the data set (e.g., sentences in a document). K, the kernel function, is a function of x and y that measures the similarity between the two vectors, therefore providing a determination of how "close" the underlying sentences are in terms of the feature set.

The kernel function may generally be known as a Normalized Polynomial Kernel. The normalization constrains the transformed value to have unit length. This technique can prevent variables that have much higher variability or much greater ranges from dominating the model.

When the SVM is implemented in Weka, the output provided in Example 3 results. Each row of the output in Example 3 provided below represents a separate support vector. In this case, there are 105 distinct support vectors.

As a result of the application of the SVM, a trained model may be generated, obtained, and used for a determination of whether the sentence is a potential material fact sentence or a non-material fact sentence. In some embodiments, the trained model may be stored in a repository in step 564.

In step 556, the computing device may be trained to recognize potential material fact sentences from non-material fact sentences via a decision tree algorithm. A decision tree is a decision-modeling tool that classifies a given input to given output class labels. That is, the decision tree implements a top down recursive divide and conquer strategy. The decision tree selects a feature to split on at a root node, creating a branch for possible values of the feature in the training data, which splits the training instances into subsets. This procedure is recursively repeated by selecting a feature again at each node using only data from the instances that reach that node, until all instances are of the same class label.

The node features on which to split are selected such that the size of the decision tree is small, thereby maximizing the information gain and minimizing the uncertainty in the data as much as possible. The heuristic used to induce the smallest decision tree is information gain. Information gain is defined as the difference in the entropy before the split and after the split. Entropy is a heuristic measure of uncertainty in the data. Feature values are discretized and information gain for every possible split point of the feature is calculated. The feature with the highest gain is chosen to branch/split the tree. The recursive splitting stops when all instances at a given node belong to same class or when there are no remaining features or instances for further partitioning. The information gain may be represented by the following equation:

Information Gain=(entropy of parent)−(weighted average of entropy of the children)

In addition, an entropy of a node may be represented by the following equation:

Entropy of a node=−Sigma ($i$=1,$n$) Probability of ($i$)*log 2 (Probability of ($i$))

As a result of the application of the decision tree algorithm, a trained model may be generated, obtained, and used for a determination of whether the sentence is a potential material fact sentence or a non-material fact sentence. In some embodiments, the trained model may be stored in a repository in step 566. An illustrative example of an application of a decision tree algorithm to obtain a trained model is provided in Example 4 below.

In step 558, the computing device may be trained to recognize potential material fact sentences from non-material fact sentences via a naïve Bayes algorithm. A naïve Bayes classifier applies Bayes' theorem by assuming naïve independence between the features. The value of a feature is assumed independent to the value of any other feature in the training instance. Each of the features is assumed to contribute equally to the probability of the class of the instance, ignoring any correlations that exist between the features. While the independence assumption is not necessarily true, the method often works well in practice.

Bayes theorem implies the following equation:

$$P(H | E) = \frac{P(E | H) \times P(H)}{P(E)}$$

where P(H) is the baseline (a priori) probability of a hypothesis H (class) in the training set. This probability is updated as new evidence E (training instance) is seen during model building. The P(H| E) is the a posteriori probability of a class given a training instance.

The independence assumption makes P(E|H)=P(E1|H)× P(E2|H) . . . P(En|H) for n features. This is known as likelihood of H (class) for a given E (training instance).

P(E) is the probability of evidence for any H, which is a constant for all hypotheses and scales all posterior hypotheses equally. In the Naïve Bayes classifier, the hypothesis that is most probable is chosen as a prediction.

An assumption is made that fact paragraph sentences are drawn from mutually exclusive classes (MaterialFact or NonMaterialFact) and can be modeled as sets of independent features mentioned earlier. P(H|E)×P(H) is computed for each class of the two classes (MaterialFact or NonMaterialFact) for a test instance and the log likelihood ratio is calculated by dividing one by the other.

Thus, a sentence is classified as a potential material fact sentence (MaterialFact) if $$P(MaterialFact| \text{Sentence}) > P(NonMaterialFact| \text{Sentence}) \Rightarrow$$
$$\ln \frac{P(MaterialFact| \text{Sentence})}{P(NonMaterialFact| \text{Sentence})} > 0.$$

It should be understood that only the log likelihood ratio of P(E|H)×P(H) of the two classes for the features of a sentence need to be computed.

As a result of the application of the naïve Bayes algorithm, a trained model may be generated, obtained, and used for a determination of whether the sentence is a potential material fact sentence or a non-material fact sentence. In some embodiments, the trained model may be stored in a repository in step 568. An illustrative example of an application of a naïve Bayes algorithm to obtain a trained model is provided in Example 5 provided below.

Predictive performance of the system can be improved by having a plurality of heterogeneous machine learning algorithms (such as those described above), all learning from the same training data, and combining the output of the algorithms via a meta classifier, such as a stacking committee of classifiers.

Stacking is an ensemble where predictions of the base learners are input to the meta-classifier. Stacking trains a meta-classifier that accepts each ensemble member's estimate as inputs and generates the ensemble output. The goal of this second level is to adjust the errors from base classifiers in such a way that the classification of the combined model is optimized. For example, if a classifier consistently misclassified instances from one region as a result of incorrectly learning the feature space of that region, a meta classifier may be trained to learn from the error. Adding the estimated errors to the outputs of the base classifiers, it can improve up on such training deficiencies. In some embodiments, logistic regression may be used as the Stacking meta classifier.

Accordingly, as shown in step 570, the stacking committee of classifiers may be applied to the data obtained from the extracted features, as well as the trained models obtained in steps 564, 566, and 568. Generally, a committee of classifiers may be constructed by teaching the committee which sentences are likely to be material fact sentences and which sentences are not material fact sentences. The features used for the classification may range from simple frequency of types of words to the number of court actions. With the stacking committee of classifiers, several base classifiers are specified (i.e., the support vector machine algorithm, the decision tree algorithm, and the naïve Bayes algorithm) and run independently on the input set (i.e., the features extracted in step 552), as described hereinabove. A combiner classifier (meta-classifier) is also specified. The combiner classifier takes the results of all the base classifiers as well as the input set and generates a final classification for each sample. The resulting output may be a trained model. In some embodiments, the output may be stored in a repository in step 580. An illustrative example of the results is provided in Example 6 provided below.

Referring again to FIG. 8, in step 426, each sentence may be identified as a potential material fact sentence or a non-material fact sentence. Such a determination may be made by processing the sentence via the steps shown and described herein with respect to FIGS. 10 and 11. The processes depicted in FIG. 11 are similar to that as previously described herein with respect to FIG. 9. That is, as shown in FIG. 11, instead of training examples of material and/or non-material fact sentences, the fact paragraphs described with respect to step 508 (FIG. 6) may be obtained in step 750. The fact paragraphs may be obtained, for example, from a repository, such as the data storage component 36 (FIG. 2). The fact paragraphs may generally contain one or more fact sentences for which a determination is to be made as to whether the sentences are potential material fact sentences or non-material fact sentences for which the trained classifier is to categorize.

In step 752, various features may be extracted from the sentences of a fact paragraph. In some embodiments, the features may be extracted in a manner similar to the method for extracting paragraph features, as shown and described herein with respect to FIG. 7. In some embodiments, the features may be extracted as shown and described herein with respect to FIG. 10.

The data obtained from the extracted features from each sentence in the fact paragraph may be used by the trained computing device (such as, for example, the server computing device 12b of FIG. 2) using the trained models described hereinabove to recognize the potential material fact sentences and distinguish them from the non-material fact sentences. In some embodiments, the fact sentences may be recognized and distinguished using one or more base classifiers. Illustrative base classifiers may include, but are not limited to, the base classifiers previously described herein.

Thus, the sentences may be recognized and distinguished using the Probabilistic Naïve Bayesian classifier, the Vector Space partitioning Support Vector Machine, and/or the Boolean Function classifier Decision Tree. For example, a support vector machine algorithm may be applied in step 754, a decision tree algorithm may be applied in step 756, and/or a naïve Bayes algorithm may be applied in step 758. In addition, a stacking committee of classifiers algorithm may be applied in step 770 to make a final determination as to whether a sentence is a potential material fact sentence or a non-material fact sentence.

As a result of using the trained models to determine whether a fact sentence is a potential material fact sentence or a non-material fact sentence, application of the support vector machine algorithm may result in an output of a first determination in step 764, application of the decision tree algorithm may result in an output of a second determination in step 766, and/or application of the naïve Bayes algorithm may result in an output of a third determination in step 768. In some embodiments, the first determination, the second determination, and the third determination may all be the same (i.e., each may determine that a fact sentence is a potential material fact sentence or a non-material fact sentence). In other embodiments, the first determination, the second determination, and the third determination may be different (e.g., one or more of the determinations may be that the fact sentence is a potential material fact sentence, and one or more of the determinations may be that the fact sentence is a non-material fact sentence). As such, the stacking committee of classifiers algorithm may be applied in step 770 to the first determination, the second determination, and the third determination based on the extracted features from step 752 and a final determination may be made as to whether the fact sentence is a potential material fact sentence or a non-material fact sentence. The final determination may be output in step 780. For example, the final determination may be output to a storage device for further reference, may be displayed via a user interface to a user, and/or the like.

EXAMPLES

Example 1—Identifying Fact Paragraphs

Prior to identifying potential material facts, fact paragraphs are first identified. Using a classifier framework, a system identifies fact paragraphs, discussion paragraphs, and outcome paragraphs within a legal opinion. The following non-limiting characteristics may be used as input features for classification:
the % paragraph position within the opinion
number of case cites
number of statute cites
number of past tense verbs
number of date occurrences
number of Shepard's signal phrases
number of this-court phrases
number of lower-court phrases
number of defendant phrases
number of plaintiff phrases
number of legal phrases Each of the phrase features is recognized via a list of possible values for the phrases. The training and test data is generated from paragraphs in case law opinions from a legal document repository. In determining fact paragraphs, discussion paragraphs, and outcome paragraphs, paragraph headings of legal documents are compared with paragraph headings known to be associated with fact paragraphs, paragraph headings known to be discussion paragraphs, and paragraph headings known to be outcome paragraphs. Any paragraph under matching known fact headings is considered a fact paragraph. Similarly, a paragraph under matching known discussion headings is considered a discussion paragraph. In addition, a paragraph under matching known outcome headings is considered an outcome paragraph.

Manual classification of paragraph headings helps identify fact, discussion, and outcome paragraphs for training and testing. Subsequently, all paragraphs without recognized headings are classified by the model. A Perl program was created and used to generate these features. A large number of legal phrases were collected over a large number of legal opinions. Instead of using a list, the paragraph text is parsed using a part-of-speech tagger and counts the number of past tense verbs, the number of past participle verbs, the number of footnote references, and the number of present tense verbs. The present tense verbs are counted after tagging the text with part-of-speech tagger. Lastly, the paragraph text itself is used to find additional features using StringToWordVector, Chi-Squared attribute evaluation and Ranker algorithms (or other attributes/algorithms if using different data mining/machine learning software).

The system incorporates three diverse machine learning algorithms such as Support Vector Machines, Decision Trees, and the naïve Bayes algorithm. A Stacking committee of classifiers is also added on top of these base classifiers, and logistic regression is used as the top level meta-classifier. The resulting accuracies of the classifiers is shown in Table 1 below.

TABLE 1

Fact/Discussion/Outcome Classifier Accuracies

|  | Class (# of instances) | SMO | Naïve Bayes | J48 | Stacking |
|---|---|---|---|---|---|
| Run 10.4.1 | Fact (4789) | 0.904 (4327) | 0.869 (4163) | 0.877 (4202) | 0.904 (4327) |
|  | Discussion (3703) | 0.701 (2596) | 0.601 (2224) | 0.701 (2597) | 0.701 (2596) |
|  | Outcome (2668) | 0.920 (2455) | 0.897 (2394) | 0.917 (2447) | 0.920 (2455) |
| Run 10.4.2 | Fact (4328) | 0.857 (4104) | 0.876 (4196) | 0.904 (4328) | 0.904 (4328) |
|  | Discussion (3703) | 0.713 (2639) | 0.625 (2314) | 0.723 (2678) | 0.713 (2639) |
|  | Outcome (2668) | 0.913 (2436) | 0.894 (2386) | 0.903 (2408) | 0.913 (2436) |
| Run 10.4.3 | Fact (4789) | 0.872 (4176) | 0.802 (3842) | 0.886 (4241) | 0.880 (4215) |
|  | Discussion (3703) | 0.700 (2591) | 0.773 (2861) | 0.696 (2578) | 0.728 (2697) |
|  | Outcome (2668) | 0.894 (2385) | 0.835 (2229) | 0.887 (2366) | 0.890 (2374) |
| Run 10.4.4 | Fact (4557) | 0.856 (3902) | 0.811 (3694) | 0.879 (4005) | 0.904 (4118) |
|  | Discussion (3703) | 0.683 (2528) | 0.731 (2707) | 0.736 (2726) | 0.719 (2664) |
|  | Outcome (2662) | 0.905 (2408) | 0.848 (2258) | 0.875 (2329) | 0.903 (2405) |

Below are the values of various properties for the example paragraph classifier model using the classifier framework:

```
AttributeSet=Numeric:__Position;Numeric:__NumCases;Numeric:__NumStatutes;Numeric:__PastTenses;
Numeric:__Dates;Numeric:__SignalWords;Numeric:__ThisCourt;Numeric:__LowerCourt;Numeric:__DefendantWords;
Numeric:__PlaintiffWords;Numeric:__LegalPhrases;Numeric:__NumFootnotes;Numeric:__PresentTenses;String:__Text;
TrainingSet=data/train
TestingSet=data/test
Arff=model/firactrainingV4.arff
Rules=model/firacrulesV4.xml
Model=model/firacclassifierV4.model
Output=results/firacresultV4
#This default PrePreprocessor removes Roman numerals, punctuation, numbers from String attributes.
PrePreprocessor=PrePreprocessor
Preprocessor=weka.filters.unsupervised.attribute.StringToWordVector
PreprocessorTrainOptions=-M 5 -W 100000 -stopwords stopwords.dat
PreprocessorTestOptions=-M 1 -W 100000 -stopwords stopwords.dat
AttributeEvaluator=weka.attributeSelection.ChiSquaredAttributeEval
AttributeEvaluatorOptions=
AttributeSearcher=weka.attributeSelection.Ranker
AttributeSearcherOptions=
RuleClassifier=
Classifiers=weka.classifiers.meta.Stacking
ClassifiersOptions=-X 2 -M weka.classifiers.functions.Logistic \
   -B weka.classifiers.functions.SMO -M \
-K "weka.classifiers.functions.supportVector.NormalizedPolyKernel -C 250007 -E 2.0" \
   -B "weka.classifiers.meta.MultiClassClassifier -M 3 -W weka.classifiers.bayes.NaiveBayes" \
   -B "weka.classifiers.meta.MultiClassClassifier -M 3 -W weka.classifiers.trees.J48 -- -C 0.25 -M 2"
ResultsMinThreshold=0.4
ResultsTopN=2
ResultsRecommend=1
```

The training paragraphs are extracted from 500 case law opinions from a legal document repository (1943 Fact, 1356 Discussion and 609 Outcome paragraphs). The test paragraphs were extracted from a mutually exclusive set of 1500 Case Law opinions (4557 Fact, 3703 Discussion, 2662 Outcome and 53,867 unknown paragraphs), which results in a classifier accuracy of about 90%.

Example 2—Potential Material Fact Sentence Recognition

Once fact paragraphs are recognized as described above in Example 1, the next step is to identify material facts within them. Paragraphs, even when classified as fact paragraphs, may contain sentences of other types of facts such as procedural facts, evidentiary facts, etc., and sometimes even discussion or outcome related sentences. This task may be performed as a sub-classification of the sentences in the fact paragraphs. Sentence classification will help towards the larger goal of extracting the subject, relation, and object triples of material facts and build an ontology of them; extraction of subject-verb-object (SVO) triples is only possible for sentences.

Unlike fact/discussion/outcome paragraph classification, there is no automatic way of generating training and test data for the sentence classifier. Crowd sourcing may be used to develop a larger sample of training and test data, for example.

A step in machine learning is to "tune" both the feature set as well as the classification algorithm to achieve the highest accuracy. Experimental runs were performed using Weka. It should be understood that other data mining/machine learning software tools may also be used. It was found that using the Weka UI tools provided an advantageous way to try different combinations of features and algorithms and compare results. In particular, Weka has a UI tool called the Experimenter that allows one to set up these combinations and run them all with a single button click. Experimenter was used to compare implementations of the second phase of the algorithm, which classifies facts into material facts and non-material facts.

In order to identify the benchmark feature set, different feature sets were experimented during different runs. The features are computed from the input data, and sometimes the input text itself is included as a feature. Below are the feature sets for different runs:

Run 1: This contains the following features:
 the % paragraph position within the opinion
 number of statute cites
 number of past tense verbs
 number of date occurrences
 number of Shepard's signal phrases
 number of defendant phrases
 number of plaintiff phrases
 number of legal phrases
 number of last names
 number of monetary figures
 number of plaintiff action phrases
 number of defendant action phrases
 number of court action phrases It is noted that there is no feature for material or non-material fact phrases in this run.

Run 2: This is identical to Run 1, with the addition of a feature that counted the number of non-material fact words in the sentence. For this run, the non-material word list was generated manually by looking at a large number of non-material fact sentences and picking words that occurred frequently in those sentences that we suspected would occur less frequently in material fact sentences.

Run 3: This is identical to Run 1, with the addition of two features—one that counted the number of material fact phrases in the input sentence, and the other counted the number of non-material fact phrases in the input sentence. In this case, the list of material and non-material phrases was computed by running the chi-squared algorithm on a list of input sentences that were known to be material or non-material.

Run 4: This is identical to Run 3, but now the non-material phrase list was replaced with the manually generated list used in run 2. (The material phrase list was still computed automatically.)

Run 5: This is identical to Run 3, but with a slightly different input set and the material fact feature removed.

The following different learning algorithms were applied for each of the feature sets identified in the above runs:

J48: A decision tree algorithm, run using the default parameters.

NB: The naïve Bayes algorithm with default parameters.

SMO-1: An implementation of the Support Vector Machine (SVM), run with default parameters.

SMO-2: SMO using NormalizedPolyKernel as the kernel function, instead of the default PolyKernel.

SMO-3: SMO using RBFKernel (Radial Basis Function) as the kernel.

Stacking-1: An ensemble learning algorithm that combines the results from multiple classifiers. With Stacking, several base classifiers are first specified, and these are run independently on the input set. A combiner classifier (meta-classifier) is also specified, and the combiner classifier takes the results of all the base classifiers as well as the input set and comes up with a final classification for each sample. For Stacking-1, SMO, J48, and Naïve Bayes (all with default parameters) were used as the base classifiers, and SMO with default parameters as the combiner classifier.

Stacking-2: Here SMO with NormalizedPolyKernel, J48, and Naïve Bayes with default parameters were used as the base classifiers, and SMO with default parameters as the combiner classifier.

Stacking-3: Here SMO with NormalizedPolyKernel, J48, and Naïve Bayes with default parameters were used as the base classifiers, and Logistic Regression as the combiner classifier.

Table 2 below summarizes classification accuracy for a variety of data sets with a variety of algorithms:

TABLE 2

Accuracy of Classifiers for Experimental Runs

|  | J48 | NB | SMO-1 | SMO-2 | SMO-3 | Stacking-1 | Stacking-2 | Stacking-3 |
|---|---|---|---|---|---|---|---|---|
| Run 1 | 75.61 | 74.18 | 79.29 | 79.29 | 78.26 | 79.29 | 79.29 | 79.82 |
| Run 2 | 87.21 | 83.45 | 87.58 | 89.66 | 88.08 | 86.11 | 89.66 | 89.16 |
| Run 3 | 84 | 78.68 | 81.34 | 84.92 | 80.34 | 82.42 | 84.92 | 85.45 |
| Run 4 | 86.63 | 83.97 | 86.55 | 88.63 | 85.61 | 86.05 | 88.63 | 88.63 |
| Run 5 | 86.78 | 83.65 | 84.71 | 88.42 | 87.87 | 88.92 | 87.37 | 89.44 |

When the average accuracy per algorithm is taken over all of the runs, the two that performed the best are SMO-2 (SVM with NormalizedPolyKernel) and Stacking-3 (SMO with NormalizedPolyKernel, J48, and Naïve Bayes as the base classifiers and Logistic Regression as the combiner classifier). For the most part, the classification algorithms performed best when the parameters were left at their default values. The one notable exception was the kernel algorithm used for SVM. Using the NormalizedPolyKernel always gave a significantly better result than the default PolyKernel.

A stacking implementation with SVM, J48, and Naïve Bayes was chosen because as the base classifiers because they all did fairly well individually and also because they are very different in how they work. Since they are so different, they are more likely to make errors on different samples, and this is where stacking can generate an improvement over the accuracy of any of the individual classifiers. Table 3 below shows the accuracy of the classifiers after additional runs were undertaken:

TABLE 3

Accuracy of Classifiers for Additional Runs

|  | Class (# of instances) | SMO (Normalized Poly Kernel) | Simple Naïve Bayes | J48 (Decision Tree) | Stacking (Logistic Regression) |
|---|---|---|---|---|---|
| Run 8 | Material Fact (119) | 0.983 (117) | 0.916 (109) | 0.782 (93) | 0.782 (93) |
|  | Non-Material Fact (74) | 0.595 (44) | 0.635 (47) | 0.851 (63) | 0.851 (63) |
| Run 9 | Material Fact (117) | 0.957 (112) | 0.897 (105) | 0.829 (97) | 0.949 (111) |
|  | Non-Material Fact (72) | 0.722 (52) | 0.764 (55) | 0.764 (55) | 0.736 (53) |
| Run 10.1 | Material Fact (117) | 0.940 (110) | 0.932 (109) | 0.906 (106) | 0.932 (109) |
|  | Non-Material Fact (72) | 0.875 (63) | 0.653 (47) | 0.819 (59) | 0.903 (65) |
| Run 10.2 | Material Fact (108) | 0.944 (102) | 0.944 (102) | 0.898 (97) | 0.907 (98) |
|  | Non-Material Fact (71) | 0.887 (63) | 0.662 (47) | 0.817 (58) | 0.901 (64) |
| Run 10.3 | Material Fact (107) | 0.897 (96) | 0.944 (101) | 0.888 (95) | 0.897 (96) |
|  | Non-Material Fact (71) | 0.873 (62) | 0.676 (48) | 0.817 (58) | 0.887 (63) |
| Run 10.4 | Material Fact (107) | 0.897 (96) | 0.944 (101) | 0.888 (95) | 0.897 (96) |
|  | Non-Material Fact (71) | 0.873 (62) | 0.676 (48) | 0.817 (58) | 0.887 (63) |

SMO with NormalizedPolyKernel, J48 Decision Tree, Naïve Bayes and Stacking ensemble with Logistic Regression as the benchmark classifiers is recommended.

The overall accuracy of identifying potential material fact sentences is the product of accuracy of classifiers identifying fact paragraphs times the accuracy of classifiers identifying material fact sentences from those fact paragraphs. As a non-limiting example, it is approximately 0.9*0.9=0.81. Thus, after about 10 rounds of learning from the manually selected training and test sentences, the committee of classifiers was able to identify potential material fact sentences in the test set with an accuracy of about 81%.

Example 3—Results of Applying a Support Vector Machine Algorithm

```
Classifier for classes: MaterialFact, NonMaterialFact
BinarySMO
     1        * <0.071429 0 0 0 0.090909 0 0 0 0.333333 0 0 0 0 > * X]
-    1        * <0 0 0.111111 0 0.090909 0.5 0.166667 0.095238 0 0 0 0 0 > * X]
-    0.989    * <0 0 0.111111 0 0.045455 0 0.166667 0 0 0 0 0 0 > * X]
+    0.4612   * <0.142857 1 0.111111 0 0.090909 0 0 0.047619 0 0 0 0.071429 0 > * X]
-    1        * <0 0 0.055556 0.333333 0.090909 0 0 0.142857 0 0 0 0.142857 0 > * X]
+    1        * <0 0 0 1 0.227273 0.5 0 0.285714 1 0.333333 0 0.214286 0 > * X]
-    0.8523   * <0 0 0 0 0.181818 0 0.166667 0.285714 0 0 0 0.071429 0 > * X]
+    1        * <0.071429 0 0 0 0.045455 0 0 0 0 0 0 0 0 > * X]
+    1        * <0 0 0 0 0.045455 0.5 0 0 0 0 0 0.071429 0 > * X]
-    1        * <0.142857 0 0 0 0.045455 0 0 0 0 0 0 0 0 > * X]
[Output truncated]
Number of support vectors: 105
```

Example 4—Results of Applying a Decision Tree Algorithm

| Training set has 3 features (F1, F2, F3) of 2 classes A and B. | | | |
|---|---|---|---|
| F1 | F2 | F3 | C |
| 1 | 1 | 1 | A |
| 1 | 1 | 0 | A |
| 0 | 0 | 1 | B |
| 1 | 0 | 0 | B |

Root node has 4 instances (2 of class A and 2 of class B).
Entropy of root = −2/4 * log2(2/4) − 2/4 * log2(2/4) = 1
Case 1:
A two way split on feature F1 (F1 = 1, F1 = 0) creates 2 children; Child 1 has 3 instances (2 of class A and 2 of class B) and Child 2 has 1 instance of class B.
Entropy of Child 1 = −(1/3)log2(1/3) − (2/3)log2(2/3) = 0.5284 + 0.39 = 0.9184.
Entropy of Child 2 = −(1/1)log2(1/1) = 0.
Information Gain = 1 − ((3/4) * 0.9184) − ((1/4) * 0) = 0.3112
Case 2:
A two way split on feature F2 (F1 = 1, F1 = 0) creates 2 children; Child 1 has 2 instances of class A and Child 2 has 2 instances of class B.
Entropy of Child 1 = −(2/2)log2(2/2) = 0.
Entropy of Child 2 = −(2/2)log2(2/2) = 0.
Information Gain = 1 − ((2/4) * 0) − ((2/4) * 0) = 1
Case 3:
A two way split on feature F3 (F3 = 1, F3 = 0) creates 2 children; Child 1 has 2 instances (1 each of class A and class B). Child 2 has 2 instances (1 each of class A and class B).
Entropy of Child 1 = −(1/2)log2(1/2) − (1/2)log2(1/2) = 1
Entropy of Child 2 = −(1/2)log2(1/2) − (1/2)log2(1/2) = 1
Information Gain = 1 − ((2/4) * 1) − ((2/4) * 1) = 1 − 1 =0
Splitting on F2 (Case 2) is reduces uncertainty most as it has the most information gain.
The tree is pruned to reduce overfitting and generalize to work with any test data by ensuring minimum number of leafs, confidence factor of a node. Each path from the root node to the leaf is a rule to classify unseen test data.

```
Following is a truncated decision tree built during learning:
Decision Tree (example output)
------------------
__NonMatFacts <= 0: MaterialFact (91.0/12.0)
__NonMatFacts > 0
|    __PresentTenses <= 2: NonMaterialFact (103.0/20.0)
|    __PresentTenses > 2
|    |    __SignalWords <= 1
|    |    |    __NonMatFacts <= 2: MaterialFact (7.0)
|    |    |    __NonMatFacts > 2: NonMaterialFact (3.0/1.0)
(Tree truncated)
```

Example 5—Results of Applying a Naïve Bayes Algorithm

Assume out of 1000 training sentences, 500 sentences have been determined to potential material fact sentences (MaterialFact) and 500 sentences have been determined to be non-material fact sentences (NonMaterialFact) with the following features:

| Class | # of training instances | Has SignalWords | Has PastTenseVerbs |
|---|---|---|---|
| MaterialFact | 500 | 425 | 350 |
| NonMaterialFact | 500 | 50 | 100 |

The a priori probabilities of the classes P(H) are:

P(MaterialFact)=500/1000=0.5

P(NonMaterialFact)=500/1000=0.5

The probability of "Likelihood", P(E1|H), P(E2,H) are:

P(has SignalWords|MaterialFact)=425/500=0.85

P(has PastTenseVerbs|MaterialFact)=350/500=0.70

P(has SignalWords|NonMaterialFact)=50/500=0.10

P(has PastTenseVerbs|NonMaterialFact)=100/500=0.20

To classify a new test sentence as material fact or non-material fact, the values of the features SignalWords, PastTenseVerbs for the sentence are extracted, Bayes theorem is applied for each of the classes, and the one with highest probability is chosen.

Bayes theorem states that $P(H|E)=(P(E|H)*P(H))/P(E)$.

The P(E), the probability of features, a constant value for any H that affects the posterior probabilities P(MaterialFact|E) and P(NonMaterialFact|E) do not need to be computed equally. Rather, the numerators can be compared, with the one having higher value chosen.

Assuming that the test sentence has SignalWords but has no PastTenseVerbs, its probability to be a MaterialFact or NonMaterialFact sentence is computed as below:

$P(MaterialFact | has\ SignalWords, has\ no\ PastTenseVerbs) =$ $P(has\ SignalWords | MaterialFact) *$ $P(has\ no\ PastTenseVerbs | MaterialFact) * P(MaterialFact) / P(E) =$ $(0.85 * (1 - 0.70) * 0.5) / P(E) = 0.1275 / P(E)$ $P(NonMaterialFact | has\ SignalWords, has\ no\ PastTenseVerbs) =$ $P(has\ SignalWords | NonMaterialFact) *$ $P(has\ no\ PastTenseVerbs | NonMaterialFact) *$ $P(NonMaterialFact) / P(E) =$ $(0.10 * (1 - 0.20) * 0.5) / P(E) = 0.0400 / P(E)$ As the denominator is same, the numerators are compared and, since 0.1275>>0.0400, the test sentence is classified as likely to be a MaterialFact sentence.

Example 6—Results of Applying a Stacking Committee of Classifiers

| Variable | Class MaterialFact |
|---|---|
| Stacking Meta classifier Logistic Regression with ridge parameter of 1.0E−8 | |
| Coefficients . . . | |
| weka.classifiers.functions.SMO-1:MaterialFact | 1.6047 |
| weka.classifiers.functions.SMO-1:NonMaterialFact | −1.6047 |
| weka.classifiers.meta.MultiClassClassifier-2:MaterialFact | −0.1963 |
| weka.classifiers.meta.MultiClassClassifier-2:NonMaterialFact | 0.1963 |
| weka.classifiers.meta.MultiClassClassifier-3:MaterialFact | 0.7981 |
| weka.classifiers.meta.MultiClassClassifier-3:NonMaterialFact | −0.7981 |
| Intercept | −0.0416 |
| Odds Ratios . . . | |
| weka.classifiers.functions.SMO-1:MaterialFact | 4.9763 |
| weka.classifiers.functions.SMO-1:NonMaterialFact | 0.201 |
| weka.classifiers.meta.MultiClassClassifier-2:MaterialFact | 0.8218 |
| weka.classifiers.meta.MultiClassClassifier-2:NonMaterialFact | 1.2169 |
| weka.classifiers.meta.MultiClassClassifier-3:MaterialFact | 2.2213 |
| weka.classifiers.meta.MultiClassClassifier-3:NonMaterialFact | 0.4502 |

The accuracies achieved by the ensemble:

| Classwise Accuracy | SMO | NaiveBayes | J48 | Stacking |
|---|---|---|---|---|
| MaterialFact | 0.897 (96/107) | 0.944 (101/107) | 0.888 (95/107) | 0.897 (96/107) |
| NonMaterialFact | 0.873 (62/71) | 0.676 (48/71) | 0.817 (58/71) | 0.887 (63/71) |
| Average Accuracy | 0.885 | 0.810 | 0.852 | 0.892 |

It should now be understood that embodiments described herein obtain data and/or electronic documents from a repository and determine whether paragraphs in the data and/or electronic documents are fact paragraphs, discussion paragraphs, or outcome paragraphs. The fact paragraphs are further analyzed to determine whether each sentence in a fact paragraph is a potential material fact sentence or a non-material fact sentence by analyzing and scoring features of each sentence using one or more trained models generated from one or more base classifiers and/or a combiner classifier.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

APPENDIX A

| Illustrative Fact Headings - Headings that may precede fact paragraphs (Not Exhaustive) | | |
|---|---|---|
| Background | Background and Facts | Background and Procedural History |
| Basic Facts | Basic Facts and Procedural History | Facts |
| Facts and Arguments | Facts and Background Information | Facts and Procedural Background |
| Facts and Procedural History | Facts and Procedure | Facts and Proceedings |
| Facts and Proceedings Below | Factual Background | Factual and Procedural Background |
| Factual and Procedural History | Factual Background and Procedural History | Nature of the Case |
| Nature of the Case and Background | Statement of Facts and Proceedings | Underlying Facts |
| Underlying Facts and Procedural History | Underlying Facts and Proceedings | |

APPENDIX B

Illustrative Legal Discussion Headings - Headings that may precede legal discussion paragraphs (Not Exhaustive)

| Discussion | Rule |
|---|---|
| Issues | Analysis |

APPENDIX C

Illustrative Legal Outcome Headings - headings that may precede legal outcome paragraphs (Not Exhaustive)

| | | |
|---|---|---|
| CONCLUSION | ULTIMATE FACTS | ORDER FOR JUDGMENT |
| CONCLUSIONS | DECREE | SUMMARY OF CONCLUSIONS |
| ORDER | FINDINGS OF FACT | |
| CONCLUSIONS OF LAW | CONCLUSIONS OF LAW | |

APPENDIX D

Illustrative Past Tense Verb List (Not Exhaustive)

| | | |
|---|---|---|
| ABASED | ABLATED | ABRIDGED |
| ABASHED | ABNEGATED | ABROGATED |
| ABATED | ABNORMALISED | ABSCINDED |
| ABBREVIATED | ABNORMALISED | ABSCISED |
| ABDICATED | ABOLISHED | ABSCONDED |
| ABDUCED | ABOLITIONISED | ABSOLVED |
| ABDUCTED | ABOLITIONIZED | ABSORBED |
| ABETTED | ABOMINATED | ABSTAINED |
| ABHORRED | ABOUGHTED | ABSTERGED |
| ABIDED | ABOUNDED | ABUTTED |
| ABIRRITATED | ABOUT-SHIPPED | ABYED |
| ABJURED | ABRADED | ABIED |
| ABLACTATED | ABREACTED | |

APPENDIX E

Illustrative Signal Word List (Not Exhaustive)

| | | |
|---|---|---|
| ADOPT | DISAGREE | MODIFY |
| AFFIRM | FIND | OVERTURN |
| CONCLUDE | HOLD | REMAND |
| REINSTATE | CONCLUDED | THE ISSUE |
| REVERSE | CONTENDED | THE QUESTION |
| UPHOLD | HELD | RAISED |
| VACATE | HOLDING | REMANDED |
| ADDRESS | ISSUE | RENDERED |
| ADOPTED | MODIFIED | REVERSED |
| AFFIRMED | OVERTURNED | VACATED |
| ARGUED | QUESTION | WHETHER |

APPENDIX F

Illustrative Present Court Word/Phrase List (Not Exhaustive)

| | |
|---|---|
| THIS COURT | WE |
| THIS JUDGE | THE SUPREME COURT |

APPENDIX G

Illustrative Lower Court Word/Phrase List (Not Exhaustive)

| | | |
|---|---|---|
| THE TRIAL COURT | THE APPELLATE JUDGE | THE SAME COURT |
| THE TRIAL JUDGE | | THE SUPERIOR COURT |
| THE APPELLATE COURT | THE COURT OF APPEAL | |

APPENDIX H

Illustrative Defendant Word List (Not Exhaustive)

| | | |
|---|---|---|
| APLEE | APPELLEES | ASSIGNEE |
| APPELLE | APPLICEE | ASSIGNEES |
| APPELLEE | APPLICEES | CAVEATEE |
| CAVEATEES | COUNTERRESPONDENT | MOVEE |
| CLAIMEE | COUNTERRESPONDENTS | MOVEES |
| CLAIMEES | DEFENDANT | ORIGINAL |
| CONDEMNEE | DEFENDANTS | PETITIONEE |
| CONDEMNEES | DEMANDEE | PETITIONEES |
| CONTESTEE | DEMANDEES | REPONDENT |
| CONTESTEES | GARNISHEE | REPONDENTS |
| COUNTERAPPELLEE | GARNISHEES | RESPONDANT |
| COUNTERAPPELLEES | INTERVENEE | RESPONDANTS |
| COUNTERCLAIM | INTERVENEES | RESPONDENT |
| COUNTERCLAIMING | INTERVENING | RESPONDENTS |
| COUNTERDEFENDANT | LIBELLEE | SUBROGEE |
| COUNTERDEFENDANTS | LIBELLEES | SUBROGEES |
| COUNTERMOVANT | LIENEE | |
| COUNTERMOVANTS | LIENEES | |

APPENDIX I

Illustrative Plaintiff Word List (Not Exhaustive)

| | | |
|---|---|---|
| APELLANT | ASSIGNOR | CLAIMANTS |
| APELLANTS | ASSIGNORS | COMPLAINANT |
| APPELANT | BANKRUPTS | COMPLAINANTS |

APPENDIX I-continued

Illustrative Plaintiff Word List (Not Exhaustive)

| | | |
|---|---|---|
| APPELANTS | CAVEATOR | CONDEMNOR |
| APPELLANT | CAVEATORS | CONDEMNORS |
| APPELLANTS | CAVEATRICES | CONTEMNOR |
| APPELLENT | CAVEATRIX | CONTEMNORS |
| APPELLENTS | CLAIMANT | CONTESTANT |
| CONTESTANTS | INTERPLEADERS | PROPONENT |
| CONTESTOR | INTERVENER | PROPONENTS |
| CONTESTORS | INTERVENERS | PROPOUNDER |
| CORSS | INTERVENOR | PROPOUNDERS |
| COUNTERAPPELLANT | INTERVENORS | PROSECUTORS |
| COUNTERAPPELLANTS | LIBELANT | PROSECUTRICES |
| COUNTERCLAIMANT | LIBELLANT | PROSECUTRIX |
| COUNTERCLAIMANTS | LIBELLANTS | PROSECUTRIXES |
| COUNTERCOMPLAINANT | LIENOR | RELATOR |
| COUNTERPETITIONER | LIENORS | RELATORS |
| COUNTERPETITIONERS | MOVANT | RELATRICES |
| COUNTERPLAINTIFF | MOVANTS | RELATRIX |
| COUNTERPLAINTIFFS | OBJECTANT | RELATRIXES |
| DEMANDANT | OBJECTANTS | RESISTER |
| DEMANDANTS | OBJECTOR | RESISTERS |
| GARNISHER | OBJECTORS | RESISTOR |
| GARNISHERS | OBLIGOR | RESISTORS |
| GARNISHOR | OBLIGORS | SUBROGOR |
| GARNISHORS | PETITIONER | SUBROGORS |
| GUARANTOR | PETITIONERS | SUBSTITUTE |
| GUARANTORS | PLAINTIFF | WARRANTOR |
| INTERPLEADER | PLAINTIFFS | WARRANTORS |

APPENDIX J

Illustrative Legal Phrases (Not Exhaustive)

| | | |
|---|---|---|
| DAMAGES | EMINENT DOMAIN | INDICTMENT |
| RECOVERABLE | EVIDENCE | CHARGING |
| DEFENDANT GUILTY | PRESENTED | INJURY OCCURRED |
| DEFENDANT | EXISTING | INSOLVENT DEBTOR |
| JUVENILE RECORD | PRECEDENT | INSUFFICIENT FUND |
| DEFENDANT MOTION | FALSE AFFIDAVIT | INSURABLE |
| DEFENDANT RACE | FEDERAL ANTITRUST | INTEREST |
| DEFENDANT REQUEST | CLAIM | INTANGIBLE PROPERTY |
| | FEDERAL IMMUNITY | |
| DEFENDANT STATEMENT | FELLOW SERVANT | IRREBUTTABLE PRESUMPTION |
| DEFICIENCY DECREE | FINAL JUDGMENT RULE | JUDICIAL |
| DETERRENT PURPOSE | GASOLINE TAX | INTERPRETATION |
| DISCLAIMER | HARMLESS BEYOND | JUDICIAL NOTICE |
| STATUTE | HEIGHTENED | LATE INDORSEMENT |
| DISTINCT OFFENSE | SCRUTINY | LEGAL STANDARD |
| DIVIDED DAMAGE | HOMESTEAD | |
| DRAIN LAW | EXEMPTION | |
| EJUSDEM GENERIS | INDEMNITY CONTRACT | |

APPENDIX K

Illustrative Present Tense Verb List (Not Exhaustive)

| | | |
|---|---|---|
| ABASE | ABDUCE | ABIRRITATE |
| ABASH | ABDUCT | ABJURE |
| ABATE | ABET | ABLACTATE |
| ABBREVIATE | ABHOR | ABLATE |
| ABDICATE | ABIDE | ABNEGATE |
| ABNORMALISE | ABOUT-SHIP | ABSOLVE |
| ABNORMALIZE | ABRADE | ABSORB |

APPENDIX K-continued

Illustrative Present Tense Verb List (Not Exhaustive)

| | | |
|---|---|---|
| ABOLISH | ABREACT | ABSTAIN |
| ABOLITIONISE | ABRIDGE | ABSTERGE |
| ABOLITIONIZE | ABROGATE | ABUT |
| ABOMINATE | ABSCIND | ABYE |
| ABOUGHT | ABSCISE | |
| ABOUND | ABSCOND | |

APPENDIX L

Illustrative Non-Material Fact Words/Phases (Not Exhaustive)

| | | |
|---|---|---|
| ACTION | ASSERTS | DISMISS |
| ALLEGE | ASSERTING | DISMISSAL |
| ALLEGES | ASSERTED | DISMISSED |
| ALLEGING | CLAIM | DISMISSING |
| ALLEGED | CLAIMS | FILE |
| APPEAL | COMPLAINT | FILED |
| APPEALED | COMPLAINTS | FILING |
| APPEALING | CONTEND | GRANT |
| AMEND | CONTENDS | GRANTED |
| AMENDED | CONTENDING | GRANTING |
| AMENDING | CONTENDED | GROUNDS |
| ANSWER | COURT | HEARING |
| ANSWERED | DENIED | JUDGMENT |
| ANSWERING | DENY | MOTION |
| ASSERT | DENYING | MOTIONS |
| MOVE | ORDERED | RESPONSE |
| MOVED | ORDERING | REVERSE |
| MOVING | PETITION | REVERSED |
| NOTICE | PLEAD | REVERSING |
| OBJECT | PLEADED | SUIT |
| OBJECTED | PLEADING | SUMMONS |
| OBJECTING | PLEADINGS | TRIAL |
| OPINION | PLED | VERDICT |
| ORDER | REMAND | |

APPENDIX M

Illustrative Non-Material Fact Sentences

Not Exhaustive

This appeal followed.

After a hearing on the motions, the trial court found that the prior-trespass doctrine indeed applied and entered an order on Aug. 29, 2011, granting summary judgment in favor of Gulf Oaks.

After a three-week trial, the jury found Bout guilty on all four counts of the indictment, and on Apr. 5, 2012, Judge Scheindlin sentenced him to concurrent terms of 180 months' imprisonment on Counts One, Two, and Four and 300 months' imprisonment on Count Three.

After concessions, the issues for decision are: (1) whether petitioners are entitled to charitable contribution deductions in excess of the $218,355 and $202,059 that respondent allowed for 2004 and 2005, respectively; (2) whether petitioners substantiated nonpassive, unreimbursed expenses of $185,800 and $75,000 that they claimed on their Schedules E, Supplemental Income and Loss, attached to their Forms 1040, U.S. Individual Income Tax Return, for 2004 and 2005, respectively; [FOOTNOTE] and (3) whether petitioners are liable for accuracy-related penalties under section 6662 (a) for 2004 and 2005.

After finding "no meaningful distinction between the facts at issue in Nicholson and the facts presented by" Plaintiff, the district court held that there was not sufficient causation to assess liability against Defendant on the LIA claim.

At the close of evidence, the trial court found appellant guilty, sentenced her to 180 days in the State Jail Division of the Texas Department of Criminal Justice, probated for a period of five years, and ordered her to pay restitution in the amount of $5,350.

At the close of Plaintiffs case-in-chief, Defendant filed a motion for judgment as a matter of law with respect to both the FELA and LIA claims, relying primarily on Nicholson.

But, as before, Appellant declined.

By way of review, the matter before the Court is a class action lawsuit concerning facsimiles allegedly sent in violation of the Telephone Consumer Protection Act ("TCPA"), [STATUTECITATION].

Classifying its action as "Non-Arbitration Case/Scire Facias Sur Mortgage," JPMorgan Chase filed its in rem mortgage foreclosure Complaint on Sep. 30, 2011. Ms. Hopkins answered several months thereafter. In her Answer, Ms. Hopkins claimed that all prior loan modifications had been vacated by JPMorgan Chase, that her loan was currently under review for a new modification and that representatives of JPMorgan Chase had advised her to stop making payments during the loan modification process. [FOOTNOTE]

D&F sued Circle S alleging failure to instruct.

Defense counsel filed a notice of appearance for Sposato on Nov. 29, 2011.

Following a hearing, the court, citing [CASECITATION], concluded that Northernaire could vote on behalf of its unbuilt units, and granted the motion.

From the time this case was filed until Fowler White was retained as special counsel, the petitioning creditors say they: provided the Trustee with substantial information they obtained during their pre-petition investigation; assisted the Trustee in obtaining the information necessary to prepare the Debtors' schedules (such as the names and addresses of hundreds of victims of the Debtors' Ponzi scheme); prepared and filed an application to have these bankruptcy proceedings recognized in Germany; provided the Trustee with documents relating to the recovery of assets; provided the Trustee with information about the Debtors' associates, bank records, and assets; and assisted the Trustee by researching the Debtor's assets.

In doing so, the Court found that the Rubin residence was not "substantially similar" to Plaintiffs copyrighted work based on the "more discerning observer," which had been relief upon by other courts to assess copyright infringement in the architectural context.

In regard to violating the TRO, the WCJ ruled that defendants would not have to pay for the lumbar discectomy.

In the course of that memorandum, USB relied on the plaintiffs responses to discovery requests in order to assert 1) that the plaintiffs executive board did not vote to commence the foreclosure action, relying instead on a "standard collection policy;" 2) that there is a question of fact as to whether the special manager had the authority to adopt a standard collection policy; and 3) that demand letters are required before a foreclosure action can be commenced, but all demand letters produced by the plaintiff predated the adoption of the collection policy and, further, those letters did not comply with either the collection policy or applicable statutory requirements.

It awarded Fannie Mae $435,178.43 against A&B and Ms. Bostwick jointly and severally with interest accruing from May 15, 2012 and ordered that the Mortgage on the property be foreclosed.

Judge Klingeberger ordered a discharge on Nov. 5, 2007 [DE 1-2 at 1] and closed the case on Nov. 8, 2007.

Later, after trial, Plaintiff filed a motion to reopen the trial record to obtain Mr. Ruble's substantive testimony in response to written questions previously posed to him in his deposition.

Legacy, through the attorney general, filed a [STATUTECITATION] motion to dismiss the counterclaim, and the state auditor filed a [STATUTECITATION] motion to dismiss the third-party claims.

Mark and Kay Baldwin executed their appeal on May 21, 2012.

Mr. Hulsey appealed that denial.

On appeal, CJS contends that the trial court erred in: (1) finding that the Hoopers had carried their burden of proving continuous, uninterrupted, peaceable, public, and unequivocal adverse possession of land outside the survey boundaries described in their deeds (i.e., the disputed area) for any period of thirty years; (2) finding that CJS and its predecessors in title had not possessed the disputed area with just title for ten years prior to the action being filed; (3) finding that the trees removed from the disputed property had a value separate and apart from the value of the immovable property on which the trees were located or their value as timber; (4) permitting an urban forester to offer opinion evidence on the "evaluation of trees"; and (5) dismissing CJS's third-party demand against the LeSage defendants where the sale document on which it was based was introduced into evidence.

On Aug. 15, 2012, an initial hearing was held where Fuller was served with the arrest warrant.

On Dec. 17, 2012, Plaintiff Toney-Dick filed this action, individually and on behalf of all others similarly situated, against the City Defendants.

On Dec. 31, 2009, the department filed a motion for an order of temporary custody and a neglect petition in this court.

On Jan. 18, 2013, DiRienzo filed an amended complaint (the "Complaint") containing five new derivative counts.

On Jul. 12, 2011, the department filed a motion for review and approval of a revised permanency plan for Kevin.

On Nov. 26, 2012, the American Center for Law the Justice filed, with leave of Court, an amicus curiae brief opposing the Department's motion to dismiss.

On the same day, Petitioner also filed a motion to stay his FAP.

Over the Government's objection, the Court permitted the defense expert witness to testify regarding the modus operandi of drug distributors provided that neither party would attempt to "elicit the expert's opinions on the ultimate issue of defendant's knowledge."

Pamela appealed, and we reversed.

PETA contended that the language of the Amended Judgment set forth above required that all unsecured claims in the Chapter 7 case be paid prior to the payment of attorney's fees and costs and that the unsecured claims totaled only approximately $ 34,339.27; that Special Counsel's contingency fee should be calculated based upon a percentage of the distribution to creditors; that Special Counsel had a conflict that precluded their representation of the Trustee because of their prior representation of the Debtor in the District Court Litigation; that reimbursement of costs incurred by Special Counsel in the District Court Litigation was limited to the district court's award of costs against PETA in the amount of $7,296.05; and, finally, that the Trustee's compensation calculated under [STATUTECITATION] was limited to a percentage of the amount distributed to unsecured creditors, exclusive of the amount paid to Special Counsel.

Plaintiffs request for accommodation was granted, and the Agency reassigned Plaintiff to the Feds Heal Program in the VACHS (Docket No. 1, page 2).

Plaintiff filed a motion seeking leave to file a Second Amended Complaint on Dec. 14, 2012.

Plaintiff filed a response to the Court's order on Sep. 9, 2013, stating that she had "mailed a copy of the Summons and Complaint to the US Department of Education as evidenced by the attached photocopy of the envelope in which said Summons and Complaint was enclosed."

Plaintiff filed this cause of action in the Northern District of Ohio on May 8, 2008.

Plaintiff took Beverly Olsen's deposition on Jun. 11, 2013 and filed a Notice of Filing of Deposition Transcript on Jun. 21, 2013.

Plaintiffs, Cora Songy, Melvin Bovie, Jannette LaGrange, Elizabeth Johnson, Oscar Bovie, Gene Bovie and Natalie Miller, filed a Petition for Injunctive Relief and Damages on May 3, 2010 against St. John the Baptist Parish ("the Parish"), seeking to enjoin the Parish from constructing any roads or other structures on their property.

Regardless of which Defendant owned the beneficial interest under the DOT, Plaintiffs' quiet title cause of action is dismissed with leave to amend.

The circuit court affirmed that decision.

The court admonishes both parents that if they should choose to live together in the future, they must undertake intensive efforts to successfully confront and therapeutically resolve the domestic violence issues referred to above, before they resume cohabitation.

The Court also entered an Order on Mar. 21, 2013 granting Sunshine's Motion to Stay Pending Appeal "on the condition that Sunshine Heifers, LLC of Chandler, Ariz. post a full cash bond of $100,000, no later than 4:30 p.m. Eastern Time on Friday, Mar. 22, 2013."

The Court also stated, "Failure to comply with this Order may result in dismissal of this action as to Defendant without further notice or hearing."

The Court declined to exercise Colorado River abstention, finding the state court analogue to be sufficiently incongruent to be considered parallel.

The court denied injunctive relief on May 1, 2013 because Kevin H. had an adequate remedy at law.

The Court further held that the Plaintiff, having failed to plead a primary violation under section 10 (b) of the 1934 Act, could not state a secondary liability claim under section 20 (a).

The court reviewed the documents that were entered into evidence and took judicial notice of the following: on Dec. 31, 2009, the court (Maronich, J.) granted the department's application for an ex parte temporary restraining order on behalf of Kevin; on Jan. 5, 2010, the order of temporary custody was sustained by agreement, and amended preliminary specific steps were ordered for the respondent parents; on Oct. 27, 2010, the court (Sommer, J.) granted on consent the department's motion for an order directing Tracy K. to take the steps necessary to correct Kevin's birth certificate; on Jan. 3, 2011, the court (Sommer, J.) terminated the respondent mother Tracy K.'s parental rights as to Kevin's sibling Jezocalynne G. (now known as Jezocalynne M.) on consent; and also on Jan. 3, 2011, the court (Sommer, J.) adjudicated Kevin neglected.

The Court tried Mandel's objection to Thrasher's claim beginning in November 2010 and ending in February 2011.

The Debtors filed a voluntary chapter 7 case on Mar. 26, 2013 [Docket No. 1].

The department filed a motion for review and approval of its permanency plan for Kevin on Sep. 22, 2010.

The District Court conducted a hearing on Aug. 31, 2012, and received evidence from Langford and the State.

The district court denied his motion.

The district court denied that motion and permitted the trial to continue.

The District Court found as follows:

The following day the trial court entered orders denying the motions to dismiss filed by Nationwide, the Vallozes, Cummins, and Allison Transmission.

The hearing continued on May 3, 2013 and concluded with closing arguments on May 29, 2013.

The miscellaneous box 10 of the UCC-1 the form provides: "Loan-Westmoore Huntley #21-$3,100,000.00" The UCC-1 also has attached to it an Exhibit A which provides: Description of Collateral All of the following described property (collectively, the "Collateral"), whether now or herein after acquired, and in which the Debtor now has or hereafter obtains any right, title, Estate or Interest, together with all additions and accessions thereto and replacements therefore, and all proceeds of such property, subject and subordinate in lien and in payment to the lien and payment of any deed of trust recorded against the property prior to the recording of this fixture filing (for purposes of this Exhibit "A", the term "proceeds" includes whatever is receivable or received when the following described property or proceeds is sold, collected, exchanged, or otherwise disposed of, whether such dispositions is voluntary or involuntary, and includes, without limitation, all rights to payment, including return premiums, with respect to any instance relating thereto): 1.

The motion for reconsideration was denied on Aug. 9, 2011.

The parties participated in a settlement conference on Mar. 26, 2013, but the matter was not resolved.

The plaintiffs request was denied.

The proposed permanency plan was termination of parental rights and adoption.

The Sixth Circuit rejected that argument.

The trial court also awarded prejudgment interest in the amount of $830,774.66, which included prejudgment interest on the portion of the award representing future damages, after finding that Huber had failed to make a goodfaith settlement attempt prior to trial.

The trial court granted the County's motion for judgment and issued a letter ruling explaining his decision.

These two claims were the only claims that were filed with the court prior to the claims bar date.

This appeal followed.

This court affirmed in [CASECITATION]

This court found that statement lacked credibility, and was another instance of "minimization" by the mother.

This included the power and authority to: (a) expend [Royce Homes's] capital and revenues in furtherance of the business of [Royce Homes]; (b) to enter into any partnership agreement, sharing arrangement, or joint venture which is engaged in any business or transaction in which [Royce Homes was] authorized to engage; (c) to . . . draw, make, execute and issue promissory notes and other negotiable or non-negotiable instruments and evidences of indebtedness, and to secure the payment of the sums so borrowed and to mortgage, pledge, or assign in trust all or any part of [Royce Homes's] property; . . . (h) to guarantee the payment of money or the performance of any contract or obligation by any person, firm or corporation on behalf of [Royce Homes]; (i) to sue and be sued, complain and defend, in the name and on behalf of [Royce Homes] and enter into such agreements, receipts, releases and discharges with respect to any such matters as the General Partner deems advisable; . . . (m) to enter into, perform and carry out contracts, agreements and to do any other acts and things necessary, appropriate or incidental to the accomplishment of the purposes of [Royce Homes]; [and] (n) to cause [Royce Homes] to borrow funds or accept other capital contributions without the consent of the limited partners.

Thrasher filed a motion seeking summary judgment on all counts on Mar. 22, 2012.

We view the evidence in the light most favorable to the prevailing party below and grant to it all reasonable inferences fairly deducible therefrom.

When Person B takes the card from Person A and expends that credit, the victim may be the credit card company because the credit card company made no such agreement with Person B. Person B has falsely pretended that he has the authority to expend the credit card company's credit, credit which was actually issued to Person A. Alternatively, the merchant selling the goods may be the victim because Person B has obtained items of value from that merchant, who gave up the goods on the understanding that Person B was actually Person A and that the credit card issuer had a credit agreement with Person A that would protect the merchant.

She asserted that UAW-GM CHR's Board of Trustees was comprised of an equal number of representatives from each organization.

HGC alleges that Connecticut Sports Shooters, as well as Michael Critser and Michael Burek (collectively, the "CSS Defendants"), organized and operated the shooting competition that day, and were responsible for the setup of the range and the safety of the competition.

Appellant alleges he was denied the opportunity to speak to a supervisor and that his request that photos be taken of the property that was to be destroyed was also denied.

Rosales then filed a written claim for permanent total disability (PTD) from the date of injury.

Jackson's attorney filed a brief pursuant to [CASECITATION] (¶ 18) (Miss. 2005).

This court has carefully considered the record, and for the reasons stated below, finds that the decision of the Commissioner should be reversed and remanded for further proceedings consistent with this opinion.

While the appeal was pending, the Trustee and PETA entered into a settlement agreement to resolve all issues between them (the "Settlement Agreement").

Scott then pled guilty to possession with the intent to distribute a controlled substance, and the other three charges against him were dismissed.

After reviewing the parties' arguments, the trial court denied appellants' summary judgment motion and granted appellees' summary judgment motion.

P7 Thiede immediately prepared a Notice of Intent to Revoke Operating Privilege under [STATUTECITATION], which states: "If a person refuses to take a [breath] test under sub.

Appellant moved for a [STATUTECITATION] judgment of acquittal, which the trial court denied.

Judge Fowlkes repeated that instruction after following Gunn into the clerk's office, then threatened to hold her in contempt of court.

The Board discussed the facts surrounding the May 1970 and March 1971 RO decisions and found that Mr. Hulsey did not appeal those decisions and that they became final.

Section 11.2.1 then explicitly defines the scope of adverse decisions and recommendations, which includes the reduction, suspension, revocation, restriction, or the failure to renew clinical privileges, denial of reappointment, and denial of appointment.

Gravitas later amended its claim to attach a variety of documents it says demonstrates the existence of a valid security interest in the trucks and the equipment located in them.

Therefore, on Dec. 15, 2006, the Hoopers filed a petition for [Pg 4] injunction and to stop the development of the subdivision against CJS, Mr. Blunt, Mr. Cantu, and *Wisteria Lakes Subdivision*.

The Sadlers alleged that, in April 2009, Nancy attempted to move her vehicle into her home's garage.

Attorney Carlson informed the defendants that Brown and Mantell would be supporting each other and she expected Mantell to be a witness for Brown in the event that the parties could not reach a settlement.

The invention claimed is:

1. A system to identify potential material fact sentences in electronic legal documents obtained from electronic repositories, the system comprising:
   a processing device; and
   a non-transitory, processor-readable storage medium in communication with the processing device, the non-transitory, processor-readable storage medium comprising one or more programming instructions that, when executed, cause the processing device to:
   obtain an electronic legal document from a repository,
   parse text within the electronic legal document to determine whether each one of one or more paragraphs in the legal document is a fact paragraph, a discussion paragraph, or an outcome paragraph based on at least one of a heading associated with the paragraph and one or more features of the paragraph, and
   for each one of the one or more paragraphs that is a fact paragraph:
      extract each one of one or more sentences in the fact paragraph,
      direct a trained sentence classifier to determine whether each one of the one or more sentences is a potential material fact sentence or a non-material fact sentence based on one or more features of the sentence, wherein:
         determining the potential material fact sentence comprises determining that a sentence potentially contains a material fact therein,
         determining the non-material fact sentence comprises determining that a sentence does not contain a material fact, and
         the material fact is a fact that is germane to a particular topic of the electronic legal document,
      identify one or more potential material fact sentences from the one or more sentences based on the determination; and
      provide the one or more potential material fact sentences to an external device.

2. The system of claim 1, wherein the one or more features of the sentence is selected from a group consisting of a number of noun phrases, a number of verb phrases, a number of dates, a number of time stamps, a number of monetary values, a number of lower court actions, a number of present court actions, a number of plaintiff actions, a number of legal phrases, a number of legal concepts, a number of non-material fact words, and a number of non-material fact phrases.

3. The system of claim 1, wherein the trained sentence classifier determines whether each one of the one or more sentences is a potential material fact sentence or a non-material fact sentence by running a natural language parser on each one of the one or more sentences to determine the one or more features of the sentence.

4. The system of claim 1, wherein the trained sentence classifier determines whether each one of the one or more sentences is a potential material fact sentence or a non-material fact sentence by scoring the one or more features based on a trained model generated by a support vector machine algorithm from training data.

5. The system of claim 1, wherein the trained sentence classifier determines whether each one of the one or more sentences is a potential material fact sentence or a non-material fact sentence by scoring the one or more features based on a trained model generated by a decision tree algorithm from training data.

6. The system of claim 1, wherein the trained sentence classifier determines whether each one of the one or more sentences is a potential material fact sentence or a non-material fact sentence by scoring the one or more features based on a trained model generated by a naïve Bayes algorithm from training data.

7. The system of claim 1, wherein the trained sentence classifier determines whether each one of the one or more sentences is a potential material fact sentence or a non-material fact sentence by scoring the one or more features based on a trained model generated from a stacking committee of classifiers algorithm from training data and data outputted from one or more base classifiers.

8. The system of claim 1, wherein the heading is a facts heading, a discussion heading, or a outcome heading.

9. The system of claim 1, wherein the one or more features of the paragraph is selected from a group consisting of a position of the paragraph, a number of cases, a number of statutes, a number of past tense verbs, a number of present court words, a number of lower court words, a number of legal phrases, a number of defendant words, a number of plaintiff words, a number of dates, a number of signal words, and a number of footnotes.

10. A method to identify potential material fact sentences in electronic legal documents obtained from electronic repositories, the method comprising:
  obtaining, by a processing device, an electronic legal document from a repository;
  parsing, by the processing device, text within the electronic legal document to determine whether each one of one or more paragraphs in the legal document is a fact paragraph, a discussion paragraph, or an outcome paragraph based on at least one of a heading associated with the paragraph and one or more features of the paragraph; and
  for each one of the one or more paragraphs that is a fact paragraph:
    extracting, by the processing device, each one of one or more sentences in the fact paragraph,
    directing, by the processing device, a trained sentence classifier to determine whether each one of the one or more sentences is a potential material fact sentence or a non-material fact sentence based on one or more features of the sentence, wherein:
      determining the potential material fact sentence comprises determining that a sentence potentially contains a material fact therein,
      determining the non-material fact sentence comprises determining that a sentence does not contain a material fact, and
      the material fact is a fact that is germane to a particular topic of the electronic legal document,
    identifying, by the processing device, one or more potential material fact sentences from the one or more sentences based on the determination, and
    providing the one or more potential material fact sentences to an external device.

11. The method of claim 10, wherein the one or more features of the sentence is selected from a group consisting of a number of noun phrases, a number of verb phrases, a number of dates, a number of time stamps, a number of monetary values, a number of lower court actions, a number of present court actions, a number of plaintiff actions, a number of legal phrases, a number of legal concepts, a number of non-material fact words, and a number of non-material fact phrases.

12. The method of claim 10, wherein the trained sentence classifier determines whether each one of the one or more sentences is a potential material fact sentence or a non-material fact sentence by running a natural language parser on each one of the one or more sentences to determine the one or more features of the sentence.

13. The method of claim 10, wherein the trained sentence classifier determines whether each one of the one or more sentences is a potential material fact sentence or a non-material fact sentence by scoring the one or more features based on a trained model generated by a support vector machine algorithm from training data.

14. The method of claim 10, wherein the trained sentence classifier determines whether each one of the one or more sentences is a potential material fact sentence or a non-material fact sentence by scoring the one or more features based on a trained model generated by a decision tree algorithm from training data.

15. The method of claim 10, wherein the trained sentence classifier determines whether each one of the one or more sentences is a potential material fact sentence or a non-material fact sentence by scoring the one or more features based on a trained model generated by a naïve Bayes algorithm from training data.

16. The method of claim 10, wherein the trained sentence classifier determines whether each one of the one or more sentences is a potential material fact sentence or a non-material fact sentence by scoring the one or more features based on a trained model generated from a stacking committee of classifiers algorithm from training data and data outputted from one or more base classifiers.

17. The method of claim 10, wherein the heading is a facts heading, a discussion heading, or a outcome heading.

18. The method of claim 10, wherein the one or more features of the paragraph is selected from a group consisting of a position of the paragraph, a number of cases, a number of statutes, a number of past tense verbs, a number of present court words, a number of lower court words, a number of legal phrases, a number of defendant words, a number of plaintiff words, a number of dates, a number of signal words, and a number of footnotes.

19. A method to identify potential material fact sentences in electronic legal documents obtained from electronic repositories, the method comprising:

obtaining, by a processing device, an electronic legal document from a repository;

parsing, by the processing device, text within the electronic legal document to determine whether each one of one or more paragraphs in the legal document is a fact paragraph, a discussion paragraph, or an outcome paragraph based on at least one of a heading associated with the paragraph and one or more features of the paragraph; and for each one of the one or more paragraphs that is a fact paragraph:
- extracting, by the processing device, each one of one or more sentences in the fact paragraph,
- directing, by the processing device, a natural language parser to parse each one of the one or more sentences in the fact paragraph to determine a number of noun phrases and a number of verb phrases,
- extracting, by the processing device, one or more features selected from a number of dates, a number of time stamps, a number of monetary values, a number of lower court actions, a number of present court actions, a number of plaintiff actions, a number of defendant actions, a number of legal phrases, a number of legal concepts, a number of non-material fact words, and a number of non-material fact phrases from each one of the one or more sentences,
- scoring, by the processing device, each one of the one or more sentences based on the number of noun phrases, the number of verb phrases, and the one or more features,
- determining, by the processing device, whether each one of the one or more sentences is a potential material fact sentence or a non-material fact sentence based on the scoring, wherein:
  - determining the potential material fact sentence comprises determining that a sentence potentially contains a material fact therein,
  - determining the non-material fact sentence comprises determining that a sentence does not contain a material fact, and
  - the material fact is a fact that is germane to a particular topic of the electronic legal document, and
- providing the one or more potential material fact sentences to an external device.

20. The method of claim 19, wherein the scoring comprises scoring each one of the one or more sentences based on a trained model generated by one or more base classifiers from training data.

* * * * *